US010720828B2

(12) United States Patent
Kojima et al.

(10) Patent No.: US 10,720,828 B2
(45) Date of Patent: Jul. 21, 2020

(54) POWER SUPPLY DEVICE AND IMAGE FORMING APPARATUS

(71) Applicant: Oki Data Corporation, Tokyo (JP)

(72) Inventors: Tomoyuki Kojima, Tokyo (JP); Hideki Shinyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/280,460

(22) Filed: Feb. 20, 2019

(65) Prior Publication Data

US 2019/0267887 A1 Aug. 29, 2019

(30) Foreign Application Priority Data

Feb. 27, 2018 (JP) ................................. 2018-032672

(51) Int. Cl.
*H02M 1/32* (2007.01)
*G03G 15/00* (2006.01)
*H02M 7/06* (2006.01)
*H02M 3/335* (2006.01)
*H02M 1/00* (2006.01)

(52) U.S. Cl.
CPC .......... *H02M 1/32* (2013.01); *G03G 15/5004* (2013.01); *G03G 15/80* (2013.01); *H02M 7/06* (2013.01); *H02M 3/33507* (2013.01); *H02M 2001/007* (2013.01)

(58) Field of Classification Search
CPC ....... H02M 2001/322; H02M 3/33523; H02M 1/32; G03G 15/5004; G03G 15/80
See application file for complete search history.

(56) References Cited

U.S. PATENT DOCUMENTS

| | | | | |
|---|---|---|---|---|
| 5,140,511 A | * | 8/1992 | Lee ........................ | H02H 7/12 323/299 |
| 2013/0113292 A1 | * | 5/2013 | Inukai ................ | G03G 15/5004 307/82 |
| 2013/0195497 A1 | * | 8/2013 | Shimura ................ | G03G 15/80 399/88 |
| 2015/0023073 A1 | * | 1/2015 | Kim ....................... | H02M 7/12 363/52 |
| 2015/0125174 A1 | * | 5/2015 | Yamaguchi ........ | G03G 15/5004 399/88 |
| 2018/0314196 A1 | * | 11/2018 | Kojima .................. | G03G 15/55 |
| 2019/0212690 A1 | * | 7/2019 | Hosokawa ......... | G03G 15/5004 |

FOREIGN PATENT DOCUMENTS

JP 2007-236166 A 9/2007

* cited by examiner

*Primary Examiner* — Gary L Laxton
(74) *Attorney, Agent, or Firm* — Muncy, Geissler, Olds & Lowe, P.C.

(57) ABSTRACT

A power supply device includes a rectifying/smoothing circuit that receives an AC voltage input and converts the AC voltage into a DC voltage by rectification and smoothing, an AC voltage cut-off detection circuit that detects a cut-off of the AC voltage, and a voltage processing circuit that is connected to a post-stage of the rectifying/smoothing circuit wherein the post-stage means a downstream side from the rectifying/smoothing circuit and operates when the AC voltage cut-off detection circuit has detected a cut-off of the AC voltage. The AC voltage cut-off detection circuit is provided with a signal transmitting element that is connected to the post-stage of the rectifying/smoothing circuit, and receives power supplied from the rectifying/smoothing circuit and sends a signal to the voltage processing circuit when the AC voltage is cut off.

12 Claims, 18 Drawing Sheets

Fig. 11 (Embodiment 3)

Fig. 14 (Embodiment 4)

Fig. 17 (Embodiment 5)

POWER SUPPLY DEVICE AND IMAGE FORMING APPARATUS

TECHNICAL FIELD

This invention relates to a power supply device and an image forming apparatus.

BACKGROUND

Conventionally, in an image forming apparatus, a cut-off of an AC (Alternating Current) input voltage of a commercial power supply was detected using an AC zero-cross circuit or the like, and a device control part was notified of the cut-off (see Patent Document 1 for example).

RELATED ART

[Patent Doc. 1] JP Laid-Open Patent Application Publication 2007-236166

However, it is impossible to predict when a cut-off of the AC input voltage of the commercial AC power supply may occur due to a power outage, a user pressing down an AC off switch of the apparatus, an AC cable of the apparatus being pulled off, or the like. Therefore, an AC input voltage cut-off detection circuit needed to be constantly powered on, causing a problem of increasing the AC power consumption during a energy-saving mode of the apparatus.

Then, at least one mode of this invention has an objective of detecting a cut-off of the input AC voltage while suppressing the AC power consumption.

SUMMARY

A power supply device, disclosed in the application, includes a rectifying/smoothing circuit that receives an AC voltage input and converts the AC voltage into a DC voltage by rectification and smoothing, an AC voltage cut-off detection circuit that detects a cut-off of the AC voltage, and a voltage processing circuit that is connected to a post-stage of the rectifying/smoothing circuit wherein the post-stage means a downstream side from the rectifying/smoothing circuit and operates when the AC voltage cut-off detection circuit has detected a cut-off of the AC voltage. The AC voltage cut-off detection circuit is provided with a signal transmitting element that is connected to the post-stage of the rectifying/smoothing circuit, and receives power supplied from the rectifying/smoothing circuit and sends a signal to the voltage processing circuit when the AC voltage is cut off.

At least one mode of this invention can suppress AC power consumption and detect a cut-off of the input AC voltage.

DETAILED DESCRIPTIONS OF THE PREFERRED EMBODIMENTS

Embodiment 1

Figure 1:
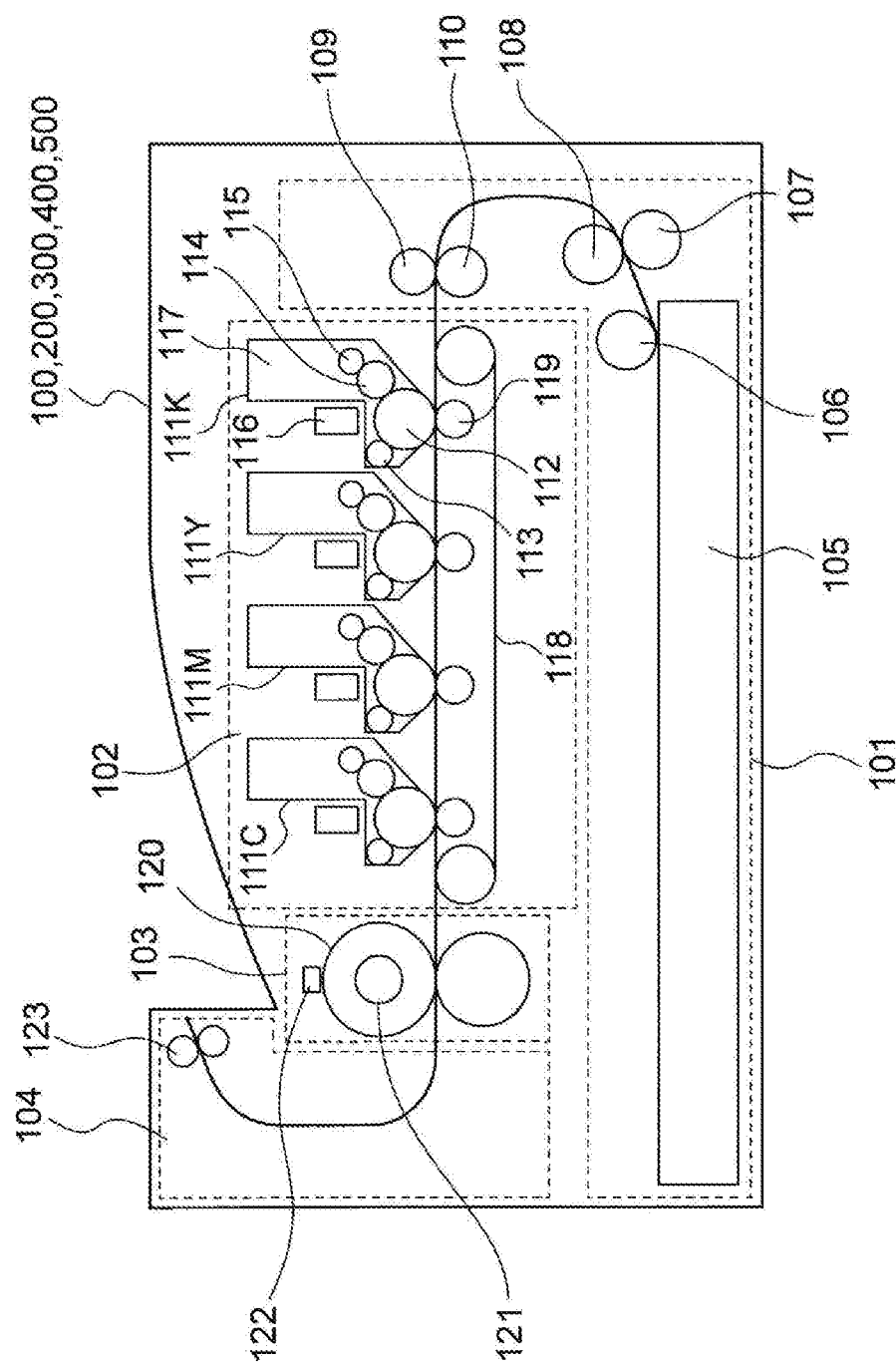
FIG. 1 is a cross-sectional view showing schematically the configuration of an image forming apparatus of Embodiment 1.

FIG. 1 is a cross-sectional view showing schematically the configuration of an image forming apparatus 100 of Embodiment 1. The image forming apparatus 100 is provided with a sheet feeding part 101, an image forming mechanism 102, a fuser 103, and a sheet ejection part 104.

The sheet feeding part 101 includes a sheet cassette 105 for setting sheets as media, pickup rollers 106, 107, and 108 for feeding the sheets, and registration rollers 109 and 110 for carrying the sheets to the image forming mechanism 102.

In the case of a color print device, the image forming mechanism 102 has separate image forming parts for respective process colors. For example, disposed in the image forming mechanism 102 from the right side of FIG. 1 are a black image forming part 111K, a yellow image forming part 111Y, a magenta image forming part 111M, and a cyan image forming part 111C.

Note that when it is not necessary to distinguish the black image forming part 111K, the yellow image forming part 111Y, the magenta image forming part 111M, and the cyan image forming part 111C, they are denoted as image forming parts 111. Also, explanations below may be given by adding capital K to configurations of the black image formation, capital Y to configurations of the yellow image formation, capital M to configurations of the magenta image formation, and capital C to configurations of the cyan image formation.

Because the black image forming part 111K, the yellow image forming part 111Y, the magenta image forming part 111M, and the cyan image forming part 111C are configured in the same manner, the configuration of the image forming parts 111 is explained with the black image forming part 111K as an example.

The image forming part 111 includes a photosensitive drum 112 that is an electrostatic latent image carrier, a charging roller 113 that is in contact with the photosensitive drum 112 and uniformly charges the surface of the photosensitive drum 112 with a high voltage, a development roller 114 that is a toner carrier to supply toner as a developer to the photosensitive drum 112, and a supply roller 115 that supplies toner to the development roller 114. Also, the image forming part 111 includes an LED head 116 that is disposed in the upper part of the photosensitive drum 112 and is an exposure part to expose the photosensitive drum 112, and a toner cartridge 117 that contains toner and is separable.

The image forming mechanism 102 includes a transfer belt 118 that carries a sheet, and a transfer roller 119 that transfers a toner image formed on the photosensitive drum 112 to the sheet.

The fuser 103 includes a fuser roller 120 that fuses toner transferred to the sheet, a heater 121 represented by a halogen lamp to heat the fuser roller 120 inside the fuser roller 120, and a temperature detection sensor 122 represented by a thermistor to detect surface temperature of the fuser roller 120. The sheet ejection part 104 includes an ejection roller 123 to eject the sheet with fusing completed.

Comparative Example

Figure 2:
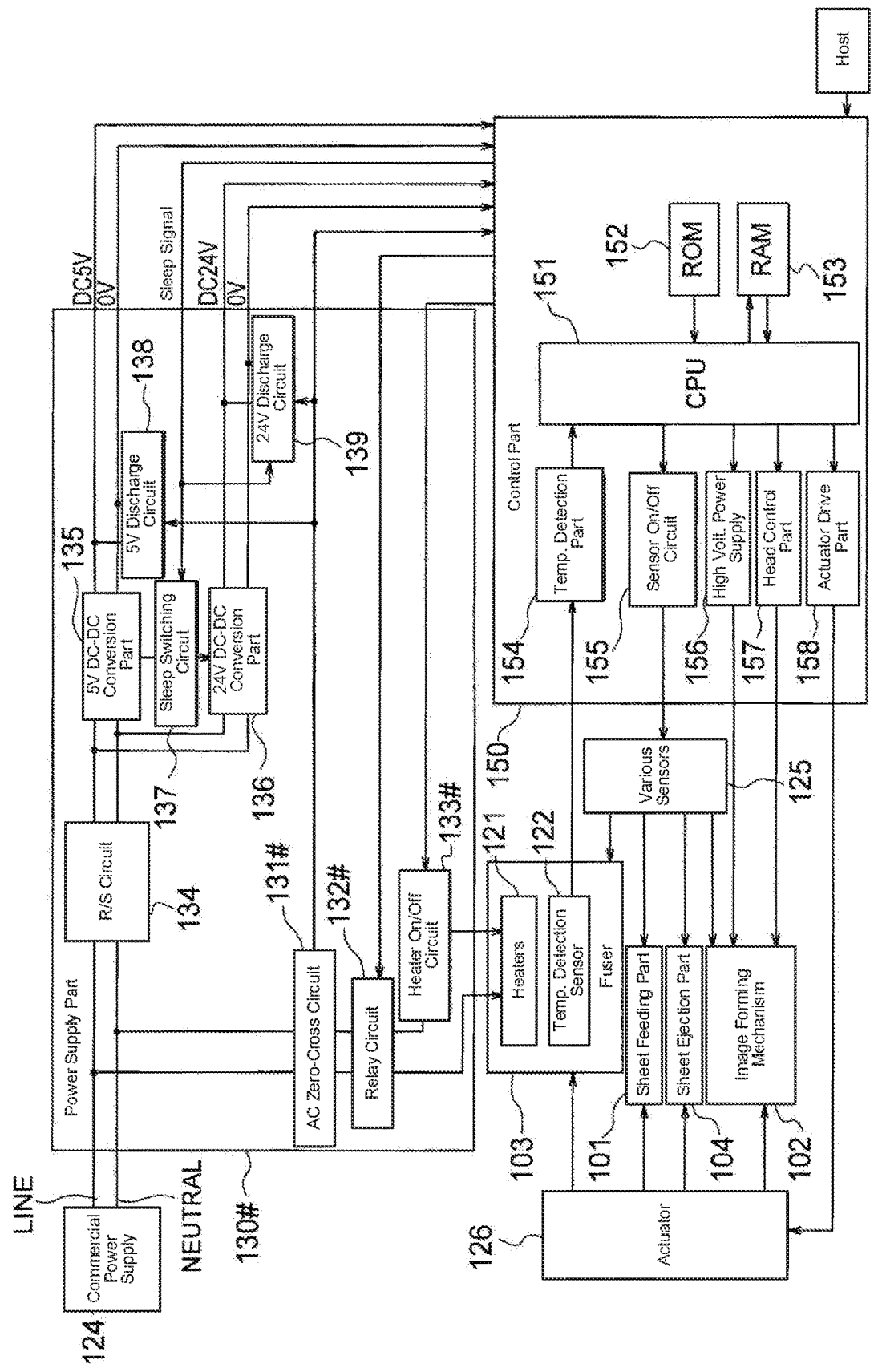
FIG. 2 is a block diagram showing the configuration of the control system of an image forming apparatus as a comparative example. It is noted that rectifying/smoothing circuits are recited R/S circuit in the drawings herein and hereafter.

FIG. 2 is a block diagram showing schematically the configuration of the control system of an image forming apparatus (not shown) as a comparative example. The image forming apparatus as a comparative example includes a sheet feeding part 101, an image forming mechanism 102, a fuser 103, a sheet ejection part 104, a power supply part 130#, and a control part 150. The sheet feeding part 101, the image forming mechanism 102, the fuser 103, and the sheet ejection part 104 are the same as those in the image forming apparatus 100 of Embodiment 1 shown in FIG. 1.

The power supply part 130# includes an AC zero-cross circuit 131#, a relay circuit 132#, a heater on/off circuit 133, a rectifying/smoothing circuit 134, a 5V DC-DC conversion part 135, a 24V DC-DC conversion part 136, a sleep switching circuit 137, a 5V discharge circuit 138, and a 24V discharge circuit 139. In general, the power supply part 130# operates by an AC voltage outputted from a commercial power supply 124 via two power lines.

The AC zero-cross circuit 131# is connected to the pre-stage of the relay circuit 132# and outputs an AC zero-cross signal to the control part 150. The AC zero-cross signal is mainly used for heater on/off control or AC cut-off detection. Also, the AC zero-cross circuit 131# is connected to the 5V discharge circuit 138 and the 24V discharge circuit 139.

The relay circuit 132# is connected to the LINE side and the NEUTRAL side of the commercial power supply 124 and turns relay on/off with a relay on/off control signal outputted from the control part 150. Also, the relay circuit 132# may occasionally be used as a relay contact point welding detection circuit depending on the connection method. The LINE side may mean hot wires, the NEUTRAL side may mean neutral wires or ground wires, which are connected to earth.

The heater on/off circuit 133 is connected to the post-stage of the relay circuit 132# and turns the heater 121 on/off according to a heater on/off control signal outputted from the control part 150. Although here the heater on/off circuit 133 is connected to the NEUTRAL side of the commercial power supply 124, it can be connected to either the LINE side or the NEUTRAL side.

The rectifying/smoothing circuit 134 converts the AC voltage into a DC voltage by rectification and smoothing. The rectifying/smoothing circuit 134 includes a rectifying circuit and a smoothing circuit. In general, a bridge diode is used as the rectifying circuit, and an electrolytic capacitor as the smoothing circuit.

The 5V DC-DC conversion part 135 converts the DC voltage generated by rectifying and smoothing the AC voltage in the rectifying/smoothing circuit 134 into DC 5 V. The 5V DC-DC conversion part 135 supplies the DC 5 V to the control part 150. The 24V DC-DC conversion part 136 converts the DC voltage generated by rectifying and smoothing the AC voltage in the rectifying/smoothing circuit 134 into DC 24 V. The 24V DC-DC conversion part 136 supplies the DC 24 V to the control part 150. In other words, the 5V DC-DC conversion part 135 and the 24V DC-DC conversion part 136 are conversion circuits that convert DC voltages. The above configuration is an example, where the DC 24 V is supplied to an actuator system, and the DC 5 V to a logic system. Generally, the DC 24 V or the DC 5 V is lowered in the power supply part 130# side or the control part 150 side and supplied to the logic system, and the kind of DC voltage outputted from the power supply part 130# is determined by the configuration of the control part 150 and can also be DC 3.3 V or DC 24 V single output.

The sleep switching circuit 137 switches between supply and cut-off of a voltage outputted from the 5V DC-DC conversion part 135 to the 24V DC-DC conversion part 136. A sleep signal outputted from the control part 150 is inputted to the sleep switching circuit 137. The sleep switching circuit 137 is connected to the 5V DC-DC conversion part 135 and the 24V DC-DC conversion part 136.

The 5V discharge circuit 138 is a discharge circuit for accelerating a drop in the 5V output when the AC voltage is cut off. The 5V discharge circuit 138 is connected to the AC zero-cross circuit and the 5V DC-DC conversion part 135. The 24V discharge circuit 139 is a discharge circuit for accelerating a drop in the 24V output when the AC voltage is cut off. The sleep signal outputted from the control part 150 is inputted to the 24V discharge circuit 139. The 24V discharge circuit 139 is connected to the AC zero-cross circuit 131# and the 24V DC-DC conversion part 136.

The control part 150 is provided with a CPU 151, a ROM 152, a RAM 153, a temperature detection part 154, a sensor on/off circuit 155, a high-voltage power supply 156, a head control part 157, and an actuator drive part 158.

The CPU 151 operates by a program written in the ROM 152 that is a nonvolatile memory part where programs and setting data are stored. The CPU 151 has a built-in counter or the like for measuring time. The RAM 153 is a memory that stores and reads data.

The temperature detection part 154 divides the output of a temperature detection sensor 122 of the fuser 103 using a resistor, and the divided voltages are outputted as temperature detection signals to the CPU 151. The sensor on/off circuit 155 is configured of a transistor, and in the power-saving mode, upon receiving the input of a sensor off signal from the CPU 151, turns off power supplied to various kinds of sensors 125.

The high-voltage power supply 156 applies high voltages to the photosensitive drum 112 of the image forming part 111 and various kinds of rollers shown in FIG. 1. The head control part 157 controls turning on/off the LED head 116 shown in FIG. 1. The actuator drive part 158 is a driver dedicated for outputting a drive signal to the actuator 126 based on a logic signal outputted from the CPU 151.

The various types of sensors 125 include unshown sheet running route sensors for sheet position detection, a sensor for image density or color shift correction installed in the sheet feeding part 101, the image forming mechanism 102, the fuser 103, and the sheet ejection part 104. The actuator 126 is driven by the actuator drive part 158. The actuator 126 includes an unshown motor, a clutch, a solenoid, or a fan for air cooling installed in the sheet feeding part 101, the image forming mechanism 102, the fuser 103, and the sheet ejection part 104 for example.

Figure 3:
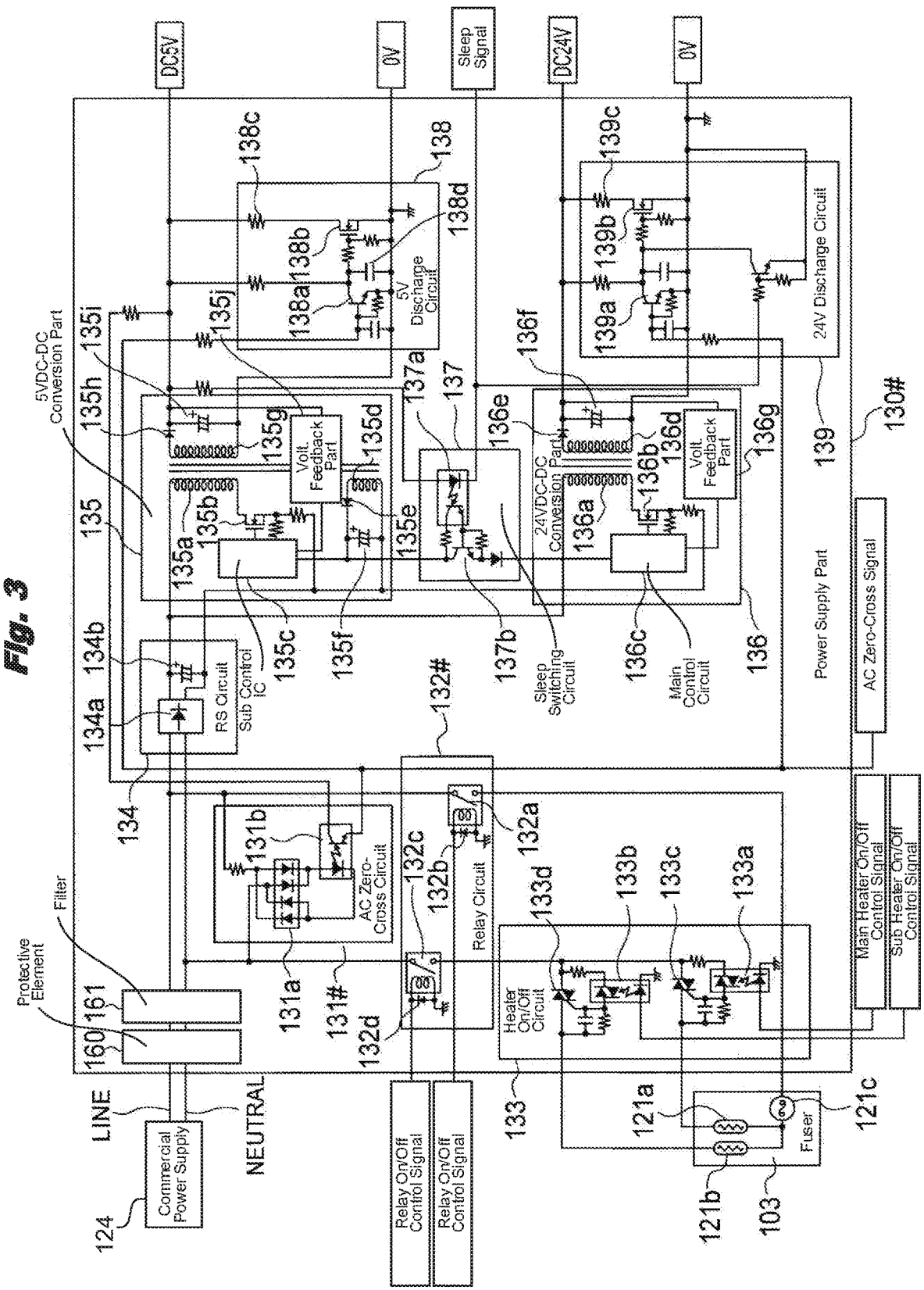
FIG. 3 is a circuit diagram showing the detailed configuration of a power supply part in the comparative example.

FIG. 3 is a circuit diagram showing the detailed configuration of the power supply part 130# in the comparative example. The power supply part 130# is provided with a protective element 160, a filter 161, the AC zero-cross circuit 131#, the relay circuit 132#, the heater on/off circuit 133, the rectifying/smoothing circuit 134, the 5V DC-DC conversion part 135, the 24V DC-DC conversion part 136, the sleep switching circuit 137, the 5V discharge circuit 138, and the 24V discharge circuit 139.

The protective element 160 is configured of a fuse for overcurrent protection, a varistor for thunder-surge protection, or the like. The filter 161 is configured of a common or normal choke coil and a capacitor.

The AC zero-cross circuit 131# is provided with a rectifying diode 131a and a photocoupler 131b, and outputs a Hi (High) level to the CPU 151 at AC voltage zero-cross points. The configuration of the AC zero-cross circuit 131# is an example and can be another configuration.

The relay circuit 132# is provided with a relay 132a and a diode 132b for preventing a counter-electromotive force of the relay coil on the LINE side, and a relay 132c and a diode 132d for preventing a counter-electromotive force of the relay coil on the NEUTRAL side. The relay circuit 132# turns the relays 132a and 132c on/off by the relay on/off control signal outputted from the CPU 151. One side of the relay coil is connected to a line for transmitting the relay on/off control signal, and the other to the GND (GROUND). Note that the GND connection can be made a line for transmitting the control signal, and the relay circuit 132# can be controlled by two lines that transmit control signals. Also, only the LINE side can have a relay mounted, which is so-called a one-way switch.

The heater on/off circuit 133 is provided with a phototriac 133a that turns on/off by a main heater on/off control signal outputted from the CPU 151, a phototriac 133b that turns on/off by a sub heater on/off control signal, a triac 133c that is a switch part that turns on/off by the phototriac 133a turning on/off, and a triac 133d that is a switch part that turns on/off by the phototriac 133b turning on/off. Although FIG. 3 shows the heater on/off circuit 133 having two circuits, depending on the number of heaters used, the heater on/off circuit 133 can be configured with one circuit or three or more circuits. Also, although one side of the phototriacs 133a and 133b is made as a GND connection, the GND connection can be made a line for transmitting a control signal so that the heater on/off circuit 133 can be controlled by two lines that transmit control signals.

The rectifying/smoothing circuit 134 is provided with a rectifying diode 134a and an electrolytic capacitor 134b. The rectifying diode 134a is configured of four diodes, often utilizing an element called a bridge diode containing four elements in general. Between the rectifying diode 134a and the electrolytic capacitor 134b, a PFC circuit (power factor correction circuit) can be mounted. Also, in order to suppress an inrush current of the electrolytic capacitor 134b when the power is turned on, the input part of the rectifying/smoothing circuit 134 is provided with an unshown inrush suppression circuit. Used as the inrush suppression circuit is a circuit that combines a thermistor, a resistor, a triac that is a switch element, and a relay.

The 5V DC-DC conversion part 135 utilizes so-called a flyback system. The 5V DC-DC conversion part 135 shown in FIG. 3 is an example and can be made another system. The 5V DC-DC conversion part 135 is provided with a sub-primary winding 135a to which inputted is a DC voltage made by rectifying and smoothing an AC voltage by the rectifying/smoothing circuit 134, a sub FET 135b, a sub control IC 135c that controls the sub FET 135b, a sub-primary auxiliary winding 135d that becomes a power supply input to the sub control IC 135c, a sub auxiliary rectifying diode 135e, a sub auxiliary smoothing electrolytic capacitor 135f, a sub secondary winding 135g, a sub secondary rectifying diode 135h, a sub secondary smoothing electrolytic capacitor 135i, and a 5V voltage feedback part 135j that is connected with the sub control IC 135c for stabilizing the DC 5 V.

Although the 24V DC-DC conversion part 136 utilizes a flyback system as an example in the same manner as the 5V DC-DC conversion part 135, it often utilizes another system such as a forward, quasi-resonant, or LLC resonant system. The 24V DC-DC conversion part 136 is provided with a main primary winding 136a to which inputted is a DC voltage made by rectifying and smoothing an AC voltage by the rectifying/smoothing circuit 134, a main FET 136b, a main control IC 136c that controls the main FET 136b, a main secondary winding 136d, a main secondary rectifying diode 136e, a main secondary smoothing electrolytic capacitor 136f, and a 24V voltage feedback part 136g connected with the main control IC 136c for stabilizing DC 24 V.

The sleep switching circuit 137 is provided with a photocoupler 137a to which the sleep signal is inputted, and a transistor 137b that turns on/off the input of a voltage rectified and smoothed by the sub-primary auxiliary winding 135d to the power supply terminal of the main control IC 136c.

The 5V discharge circuit 138 is provided with a transistor 138a to whose base the secondary-side phototransistor of the photocoupler 131b of the AC zero-cross circuit 131# is connected, a discharge FET 138b to whose gate the collector of the transistor 138a is connected, and a discharge resistor 138c connected to the drain of the discharge FET 138b. Although the discharge FET 138b can be a bipolar transistor, in this example an FET is used as an example.

The 24V discharge circuit 139 is configured in the same manner as the 5V discharge circuit 138. For example, the 24V discharge circuit 139 is provided with a transistor 139a to whose base the secondary-side phototransistor of the photocoupler 131b of the AC zero-cross circuit 131# is connected, a discharge FET 139b to whose gate the collector of the transistor 139a is connected, and a discharge resistor 139c connected to the drain of the discharge FET 139b. Although the discharge FET 139b can be a bipolar transistor, in this example an FET is used as an example.

The fuser 103 is provided with heaters 121a and 121b represented by a halogen heater, ceramic heater, or the like, and a thermostat 121c for protection. By the relays 132a and 132c and the triacs 133c and 133d of the heater on/off circuit mentioned above turning on, voltages are supplied to the heaters 121a and 121b.

Figure 4:
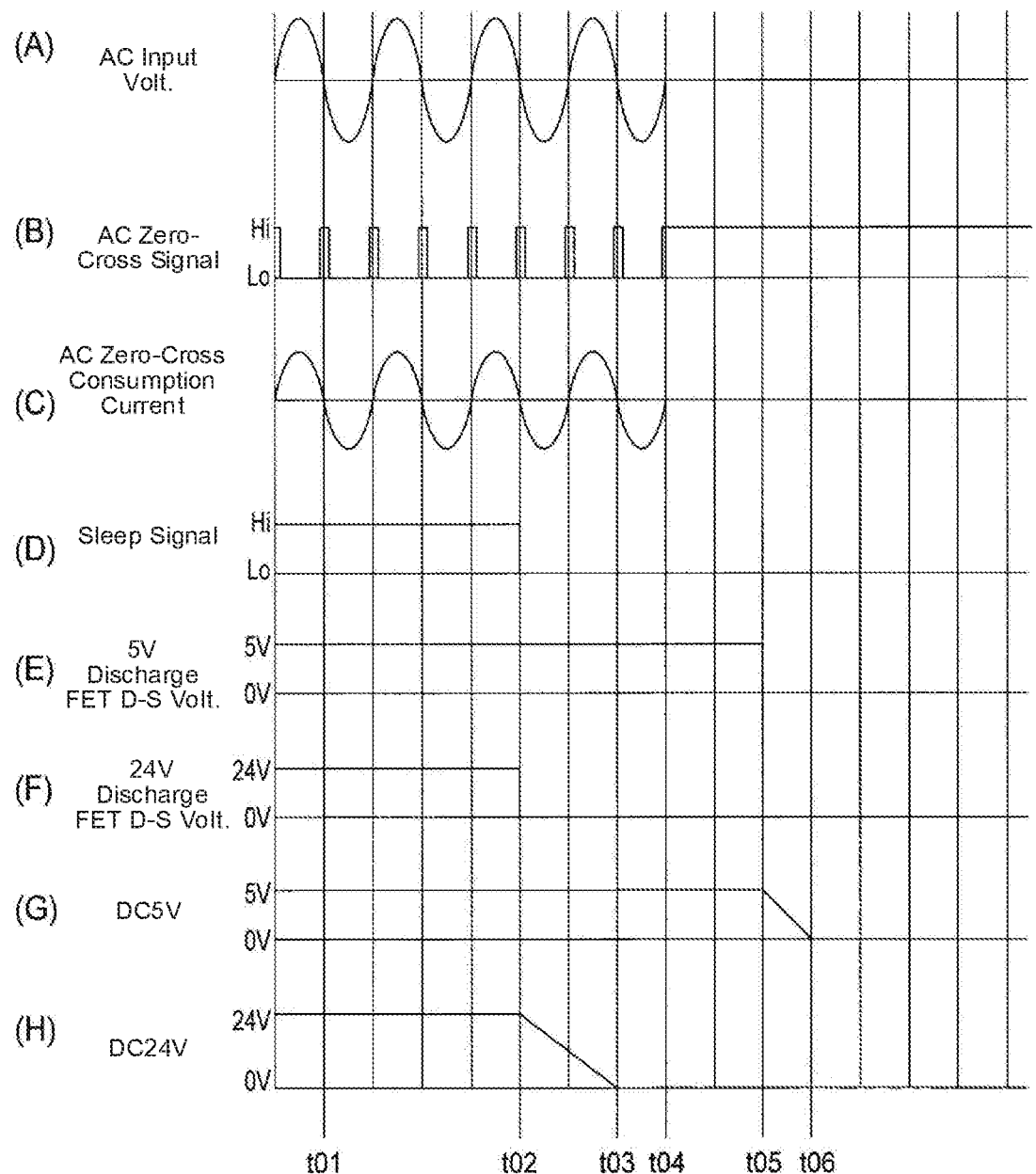
FIG. 4, which includes (A)-(H), is timing charts for explaining operations in the power supply part in the comparative example.

(A)-(H) of FIG. 4 are timing charts for explaining operations in the comparative examples in FIGS. 2 and 3. Explained in (A)-(H) of FIG. 4 are operations when moving into sleep that is an energy-saving mode and when the AC voltage is cut off. The horizontal axes in (A)-(H) of FIG. 4 indicate time, the vertical axes in FIGS. 4(A), (B), and (D)-(H) indicate voltage, and the vertical axis in FIG. 4(C) indicates current.

An AC input voltage shown in FIG. 4(A) is an AC voltage outputted from the commercial power supply 124, in other words an AC voltage inputted to the power supply part 130#. The AC zero-cross signal shown in FIG. 4(B) is a signal outputted to the control part 150 from the AC zero-cross circuit 131#. In the AC zero-cross signal, pulses are outputted at zero-cross points of the AC input voltage shown in FIG. 4(A). An AC zero-cross consumption current shown in FIG. 4(C) is a current consumed by the AC zero-cross circuit 131#. The value of the consumed current is determined by the primary photodiode current limiting resistor of the photocoupler 131b of the AC zero-cross circuit 131#.

The sleep signal shown in FIG. 4(D) is a signal outputted from the control part 150 to the power supply part 130#. In the sleep signal, Hi indicates a standby mode, and Lo indicates a sleep mode. By moving from the standby mode to the sleep mode, the operation of the 24V DC-DC conversion part 136 is turned off, saving energy.

A 5V discharge FET D-S voltage shown in FIG. 4E indicates the voltage between the drain terminal and the source terminal of the 5V discharge FET 138b. A 24V discharge FET D-S voltage shown in FIG. 4(F) indicates the voltage between the drain terminal and the source terminal of the 24V discharge FET 139b.

DC 5 V shown in FIG. 4(G) indicates an output voltage outputted from the power supply part 130# to the control part 150. DC 24 V shown in FIG. 4(H) indicates an output voltage outputted from the power supply part 130# to the control part 150.

Next, operations are explained using FIG. 4 in the order of time t01 through time t06 indicated on the horizontal axis. At time t01, FIGS. 4(A)-4(H) show waveforms during the standby mode, that is a state waiting for printing as an apparatus operation.

When the AC input voltage shown in FIG. 4(A) is 0 V, the AC zero-cross signal shown in FIG. 4(B) becomes Hi. The AC zero-cross consumption current shown in FIG. 4(C) varies according to the AC input voltage shown in FIG. 4(A).

The sleep signal shown in FIG. 4(D) maintains the Hi state, the output voltage shown in FIG. 4(G) indicates DC 5 V, and the output voltage shown in FIG. 4(H) indicates DC 24 V. At this time, the secondary photodiode of the photocoupler 137a of the sleep switching circuit 137 is on, and the transistor 137b is on, thereby the rectified and smoothed voltage of the sub-primary auxiliary winding 135d of the 5V DC-DC conversion part 135 is supplied to the power supply terminal of the main control IC 136c of the 24V DC-DC conversion part 136.

Because the 5V discharge FET 138b is off, the 5V discharge FET D-S voltage is 5 V as shown in FIG. 4(E), and because the 24V discharge FET 139b is also off in the same manner, the 24V discharge FET D-S voltage shown in FIG. 4F is 24 V, having no current flowing to the discharge resistors 138c or 139c.

At time t02, by the standby mode continuing for a certain length of time, the image forming apparatus moves into the sleep mode. Because the AC zero-cross signal shown in FIG. 4(B) is constantly powered, it does not change. In the same manner, the AC zero-cross consumption current shown in FIG. 4(C) does not change, either.

As shown in FIG. 4(D), the sleep signal outputted from the control part 150 switches from Hi to Lo, the secondary photodiode of the photocoupler 137a of the sleep switching circuit 137 turns off, and the transistor 137b turns off, thereby cutting off the supply of the rectified and smoothed voltage of the sub-primary auxiliary winding 135d of the 5V DC-DC conversion part 136 to the power supply terminal of the main control IC 136c of the 24V DC-DC conversion part 136. In other words, because the gate voltage input to the main FET 136b of the 24V DC-DC conversion part 136 stops, the operation of the 24V DC-DC conversion part stops, and the DC 24V output starts to drop as shown in FIG. 4(H). At the same time, as shown in FIG. 4(F), by the sleep signal outputted from the control part 150, the 24V discharge FET 139b of the 24V discharge circuit 139 turns on, a current flows to the discharge resistor 139c, accelerating the drop in the DC 24V output, and the output voltage becomes 0 V at time t03.

At time t04, due to a power outage, turning off an unshown power supply switch of the apparatus, or pulling off an AC cable of the apparatus, the AC input voltage is cut off as shown in FIG. 4(A). The AC zero-cross signal shown in FIG. 4(B) remains Hi by the photocoupler 131b of the AC zero-cross circuit 131# turning off and the secondary phototransistor turning off. The AC zero-cross consumption current shown in FIG. 4(C) becomes 0 A because power stops going to the photocoupler 131b of the AC zero-cross circuit 131#.

As shown in FIG. 4(G), immediately after an AC input voltage cut-off, the 5V discharge FET 138b of the 5V discharge circuit 138 retains 5 V. This is because the apparatus operation needs to be continued through a short-time power outage for about 20 ms for example. As an example of the method to retain power, as shown in FIG. 3, a capacitor 138d can be connected to the gate of the 5V discharge FET 138b, providing it with the time constant of a resistor and the capacitor 138d to delay the turn-off of the 5V discharge FET 138b.

At time t05, as shown in FIG. 4(E), after a predetermined length of time passed, the 5V discharge FET 138b of the 5V discharge circuit 138 turns on, the 5V discharge FET D-S voltage becomes 0 V, and a current flows to the discharge resistor 138c, accelerating the drop in the DC 5V output. At time t06, as shown in FIG. 4(G), the output voltage becomes 0 V.

Embodiment 1

Figure 5:
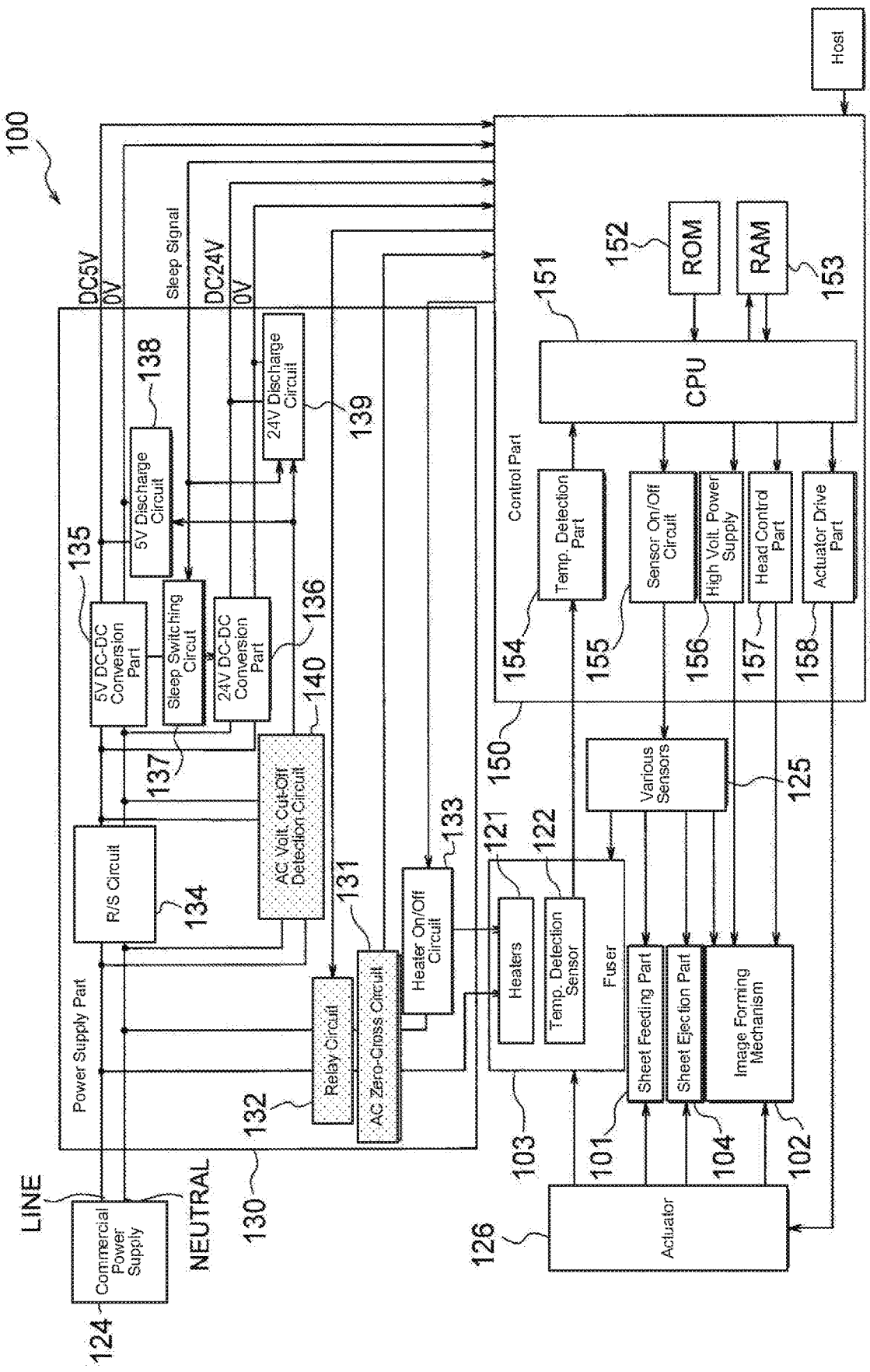
FIG. 5 is a block diagram showing schematically the configuration of the control system of the image forming apparatus of Embodiment 1.

FIG. 5 is a block diagram showing schematically the configuration of the control system of the image forming apparatus 100 of Embodiment 1. The image forming apparatus 100 of Embodiment 1 includes the sheet feeding part 101, the image forming mechanism 102, the fuser 103, the sheet ejection part 104, a power supply part 130 as a power supply device, and a control part 150. In FIG. 5, detailed explanations on the same parts as in FIG. 2 are omitted by giving them the same codes as in FIG. 2.

The power supply part 130 includes an AC zero-cross circuit 131, a relay circuit 132, a heater on/off circuit 133, a rectifying/smoothing circuit 134, a 5V DC-DC conversion part 135, a 24V DC-DC conversion part 136, a sleep switching circuit 137, a 5V discharge circuit 138, a 24V discharge circuit 139, and an AC voltage cut-off detection circuit 140. In general, the power supply part 130 operates by an AC voltage outputted from a commercial power supply 124. The 5V discharge circuit 138 and the 24V discharge circuit 139 are voltage processing circuits that operate when the AC voltage cut-off detection circuit 140 has detected a cut-off of the AC voltage.

The power supply part 130 shown in FIG. 5 is configured in the same manner as the power supply part 130# shown in FIG. 2 except that the AC zero-cross circuit 131 is disposed in the post-stage of the relay circuit 132 and that the AC voltage cut-off detection circuit 140 is connected to the pre-stage and the post-stage of the rectifying/smoothing circuit 134.

Figure 6:
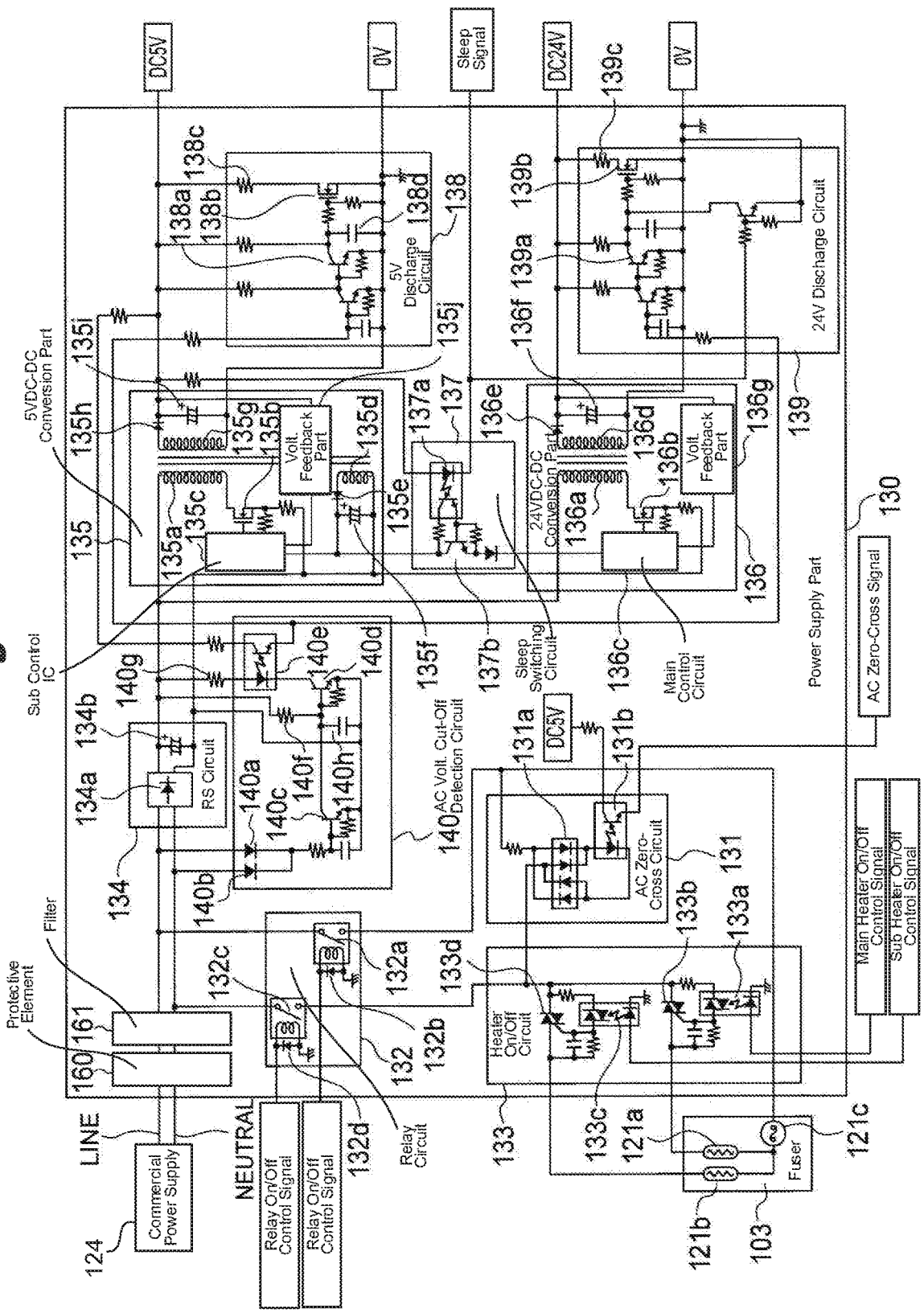
FIG. 6 is a circuit diagram showing the detailed configuration of a power supply part in Embodiment 1.

FIG. 6 is a circuit diagram showing the detailed configuration of the power supply part 130 in Embodiment 1. The power supply part 130 is provided with a protective element 160, a filter 161, the AC zero-cross circuit 131, the relay circuit 132, the heater on/off circuit 133, the rectifying/smoothing circuit 134, the 5V DC-DC conversion part 135, the 24V DC-DC conversion part 136, the sleep switching circuit 137, the 5V discharge circuit 138, the 24V discharge circuit 139, and the AC voltage cut-off detection circuit 140. Here, mainly explained are differences from the power supply part 130# in the comparative example shown in FIG. 3.

As shown in FIG. 6, the AC zero-cross circuit 131 is disposed in the post-stage of the relay circuit 132. The AC zero-cross circuit 131 is provided with a rectifying diode 131a and a photocoupler 131b and outputs a Hi level to a CPU 151 at AC voltage zero-cross points. The AC zero-cross circuit configuration is an example, and its configuration is not particularly limited. If the AC zero-cross signal is inputted to the control part 150 to be used for heater control or the like, the AC zero-cross signal needs to be inputted after operating the relay circuit 132. Note that in Embodiment 1 because no power supply turn-off is detected in the AC zero-cross circuit 131, the AC zero-cross circuit 131 can be disposed in the post-stage of the relay circuit 132. Therefore, there is no need to supply power constantly to the photocoupler 131b that consumes large power, allowing power saving to be realized.

The AC voltage cut-off detection circuit 140 is provided with a rectifying diode 140a, a rectifying diode 140b, a transistor 140c that functions as a switching element, a transistor 140d, a photocoupler 140e, a resistor 140f, and a resistor 140g. The rectifying diode 140a is connected to the LINE side of the pre-stage of the rectifying/smoothing circuit 134, and the rectifying diode 140b is connected to the NEUTRAL side of the pre-stage of the rectifying/smoothing circuit 134. The rectifying diode 140a and the rectifying diode 140b are rectifying elements that rectify an AC voltage. Here, a full-wave rectification of the AC voltage is performed by the rectifying diode 140a and the rectifying diode 140b.

Connected to the base of the transistor 140c is the cathodes of the rectifying diode 140a and the rectifying diode 140b. Connected to the collector of the transistor 140d is the photocoupler 140e. The secondary phototransistor of the photocoupler 140e is connected to the 5V discharge circuit 138 and the 24V discharge circuit 139. The photocoupler 140e is a signal transmitting element that sends a signal indicating that the AC voltage is cut off to the 5V discharge circuit 138 and the 24V discharge circuit 139. The base current limiting resistor 140f of the transistor 140d and the current limiting resistor 140g of the photocoupler 140e are connected to the post-stage of the rectifying/smoothing circuit 134. In the configuration above, when the transistor 140c turns off, the photocoupler 140e sends a signal to the 5V discharge circuit 138 and the 24V discharge circuit 139.

Figure 7:
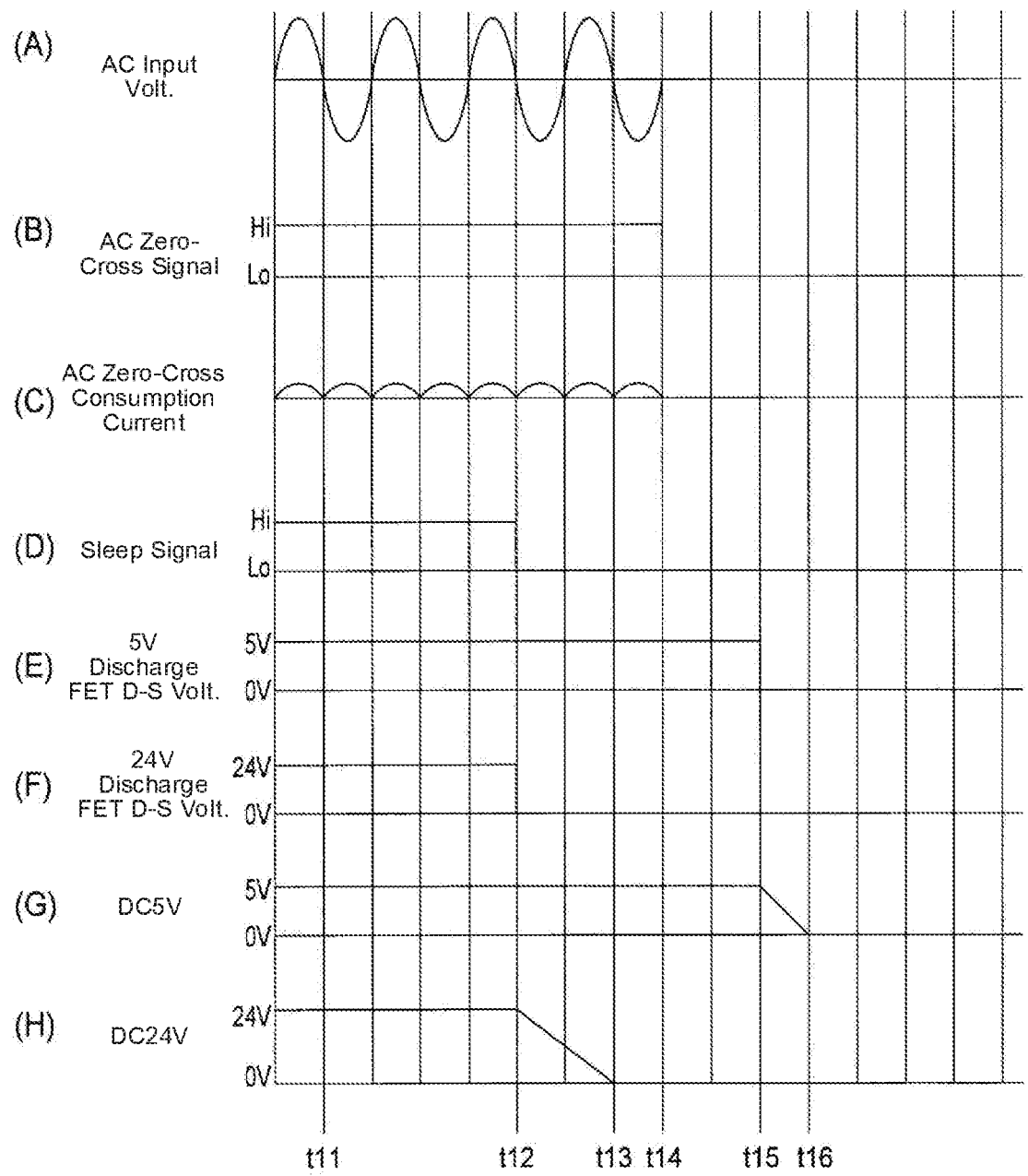
FIG. 7, which includes (A)-(H), is timing charts for explaining operations in the power supply part in Embodiment 1.

(A)-(H) of FIG. 7 are timing charts for explaining operations in the power supply part 130 in Embodiment 1. Explained in (A)-(H) of FIG. 7 are operations when moving into sleep that is an energy-saving mode and when the AC voltage is cut off. The horizontal axes in FIGS. 7(A)-(H) indicate time, the vertical axes in FIGS. 7(A), (B), and (D)-(H) indicate voltage, and the vertical axis in FIG. 7(C) indicates current.

An AC input voltage shown in FIG. 7(A) is an AC voltage outputted from the commercial power supply 124, in other words an AC voltage inputted to the power supply part 130. An AC off signal shown in FIG. 7(B) is a signal outputted from the AC voltage cut-off detection circuit 140. The AC off signal indicates at Hi that the AC input voltage is supplied, and indicates at Lo that the AC input voltage is cut off. An AC off circuit consumption current shown in FIG. 7(C) is a current consumed by the AC voltage cut-off detection circuit 140. The value of the AC off circuit consumption current is determined by the base current and the collector current of the transistor 140c of the AC voltage cut-off detection circuit 140.

A sleep signal shown in FIG. 7(D) is a signal outputted from the control part 150 to the power supply part 130. The sleep signal indicates a standby mode at Hi and a sleep mode at Lo. By moving from the standby mode into the sleep mode, the operation of the 24V DC-DC conversion part 136 is turned off, achieving energy saving.

A 5V discharge FET D-S voltage shown in FIG. 7(E) indicates the voltage between the drain terminal and the source terminal of the 5V discharge FET 138b. A 24V discharge FET D-S voltage shown in FIG. 7(F) indicates the voltage between the drain terminal and the source terminal of the 24V discharge FET 139b.

DC 5 V shown in FIG. 7(G) indicates an output voltage outputted from the power supply part 130 to the control part 150. DC 24 V shown in FIG. 7(H) indicates an output voltage outputted from the power supply part 130 to the control part 150.

Next, operations are explained using FIG. 7 in the order of time t11 through time t16 indicated on the horizontal axis. At time t11, FIGS. 7(A)-7(H) show waveforms during the standby mode. As the operation of the image forming apparatus 100, it is a state of waiting for printing. Here, because the transistor 140c of the AC voltage cut-off detection circuit 140 is on, no current flows to the photocoupler 140e, and the secondary phototransistor of the photocoupler 140e is off. Therefore, the AC off signal shown in FIG. 7(B) is in a state of retaining Hi.

Because the connection of the AC voltage cut-off detection circuit 140 to the pre-stage of the rectifying/smoothing circuit 134 is on both the LINE side and the NEUTRAL side, the AC off circuit consumption current shown in FIG. 7(C) becomes a full-wave rectified waveform. Here, as shown in FIG. 4C, in the comparative example, the photocoupler 131b of the AC zero-cross circuit 131# is constantly powered. For stably turning on the primary photodiode of the photocoupler 131b, a current of at least about 1 mA needs to flow, that is equivalent to consumed power of 0.1-0.23 W with an AC 100-230 V input. Recently, power consumption reduction in an energy-saving mode has been progressing, and consumed power of 0.1 W or less by the whole apparatus is common, therefore it is a big problem that the consumed power of a partial circuit becomes 0.1-0.23 W. Note that although the consumed power of the photocoupler 140e may occasionally be set to 1 mA or less presuming its actual power value instead of its guaranteed value, reducing the consumed power has a limitation.

In Embodiment 1, because only the transistor 140c of the AC voltage cut-off detection circuit is constantly powered, the consumed current can be suppressed to the μA order. It is expected that this converts into equivalent consumed power of several ten mW with an AC 100-230 V input.

The sleep signal shown in FIG. 7(D) maintains the Hi state. The output voltage shown in FIG. 7(G) indicates DC 5 V, and the output voltage shown in FIG. 7(H) indicates DC 24 V. At this time, the secondary photodiode of the photocoupler 137a of the sleep switching circuit 137 is on, and the transistor 137b is on. Therefore, the rectified and smoothed voltage of the sub-primary auxiliary winding 135d of the 5V DC-DC conversion part 135 is supplied to the power supply terminal of the main control IC 136c of the 24V DC-DC conversion part 136. Also, because the 5V discharge FET 138b is off, as shown in FIG. 7(E), the 5V discharge FET D-S voltage is 5V. Because the 24V discharge FET 139b is also off, as shown in FIG. 7(F), the 24V discharge FET D-S voltage is 24 V. Therefore, no current flows to the discharge resistor 138c or 139c.

At time t12, by the standby mode continuing for a certain length of time, the image forming apparatus 100 moves into the sleep mode. The AC off signal shown in FIG. 7(B) does not change. In the same manner, the AC off circuit consumption current shown in FIG. 7(C) does not change, either.

As shown in FIG. 7(D), the sleep signal outputted from the control part 150 switches from Hi to Lo. Then, the secondary photodiode of the photocoupler 137a of the sleep switching circuit 137 turns off, and the transistor 137b turns off, thereby cutting off the supply of the rectified and smoothed voltage of the sub-primary auxiliary winding 135d of the 5V DC-DC conversion part 135 to the power terminal of the main control IC 136c of the 24V DC-DC conversion part 136. In other words, because the gate voltage input to a main FET 136b of the 24V DC-DC conversion part 136 stops, the operation of the 24V DC-DC conversion part 136 stops, and as shown in FIG. 7(H), the DC 24V output starts to drop. At the same time, by the sleep signal outputted from the control part 150, the 24V discharge FET 139b of the 24V discharge circuit 139 turns on, a current flows to a discharge resistor 139c, accelerating the DC 24V output, and the output voltage becomes 0 V at time t13.

At time t14, due to a power outage, turning off an unshown power supply switch of the image forming apparatus 100, or pulling off an AC cable of the image forming apparatus 100, the AC input voltage is cut off as shown in FIG. 7(A). Once the AC input voltage is cut off, the transistor 140c of the AC voltage cut-off detection circuit 140 turns off, and the transistor 140d turns on, thereby a current flows to the primary photodiode of the photocoupler 140e. Being connected to the post-stage of the rectifying/smoothing circuit 134, the voltage supply source of the photocoupler 140e is the remaining charge of an electrolytic capacitor 134b for smoothing. Also, because the AC input voltage is cut off, even if a current flows to the primary photodiode of the photocoupler 140e, no AC consumption current occurs. By the photocoupler 140e turning on, as shown in FIG. 7(B), the AC off signal switches from Hi to Lo.

Immediately after the AC input voltage cut-off, as shown in FIG. 7(E), the 5V discharge FET 138b of the 5V discharge circuit 138 retains 5 V. This is because the apparatus operation needs to be continued through a short-time power outage for about 20 ms for example. As an example of the method to retain power, as shown in FIG. 6, a capacitor 138d can be connected to the gate of the 5V discharge FET 138b, providing it with the time constant of a resistor and the capacitor 138d to delay the turn-off of the 5V discharge FET 138b. Also, as shown in FIG. 6, a capacitor 140h can be connected to the base of the transistor 140d of the AC voltage cut-off detection circuit 140, providing it with the time constant of a resistor and the capacitor 140h to delay the 5V discharge FET 138b turn-off.

At time t15, after a predetermined length of time passed, the 5V discharge FET 138b of the 5V discharge circuit 138 turns on, the 5V discharge FET D-S voltage becomes 0 V as shown in FIG. 7(E), and a current flows to the discharge resistor 138c, accelerating the drop in the DC 5V output. Then, at time t16, as shown in FIG. 7(G), the output voltage becomes 0 V.

As stated above, by the image forming apparatus 100 of Embodiment 1, because the transistor 140c of the AC voltage cut-off detection circuit 140 is connected to the pre-stage of the rectifying/smoothing circuit 134, in comparison with the photocoupler 131b in the comparative example, the consumed power for detecting an AC voltage cut-off can be suppressed. Also, because the photocoupler 140e installed for notifying that the AC voltage is cut off is connected to the post-stage of the rectifying/smoothing circuit 134, its voltage supply source is the remaining charge of the electrolytic capacitor 134b for smoothing, therefore no AC consumption current occurs.

Embodiment 2

As shown in FIG. 1, an image forming apparatus 200 of Embodiment 2 is provided with a sheet feeding part 101, an image forming mechanism 102, a fuser 103, and a sheet ejection part 104 in the same manner as in Embodiment 1.

Figure 8:
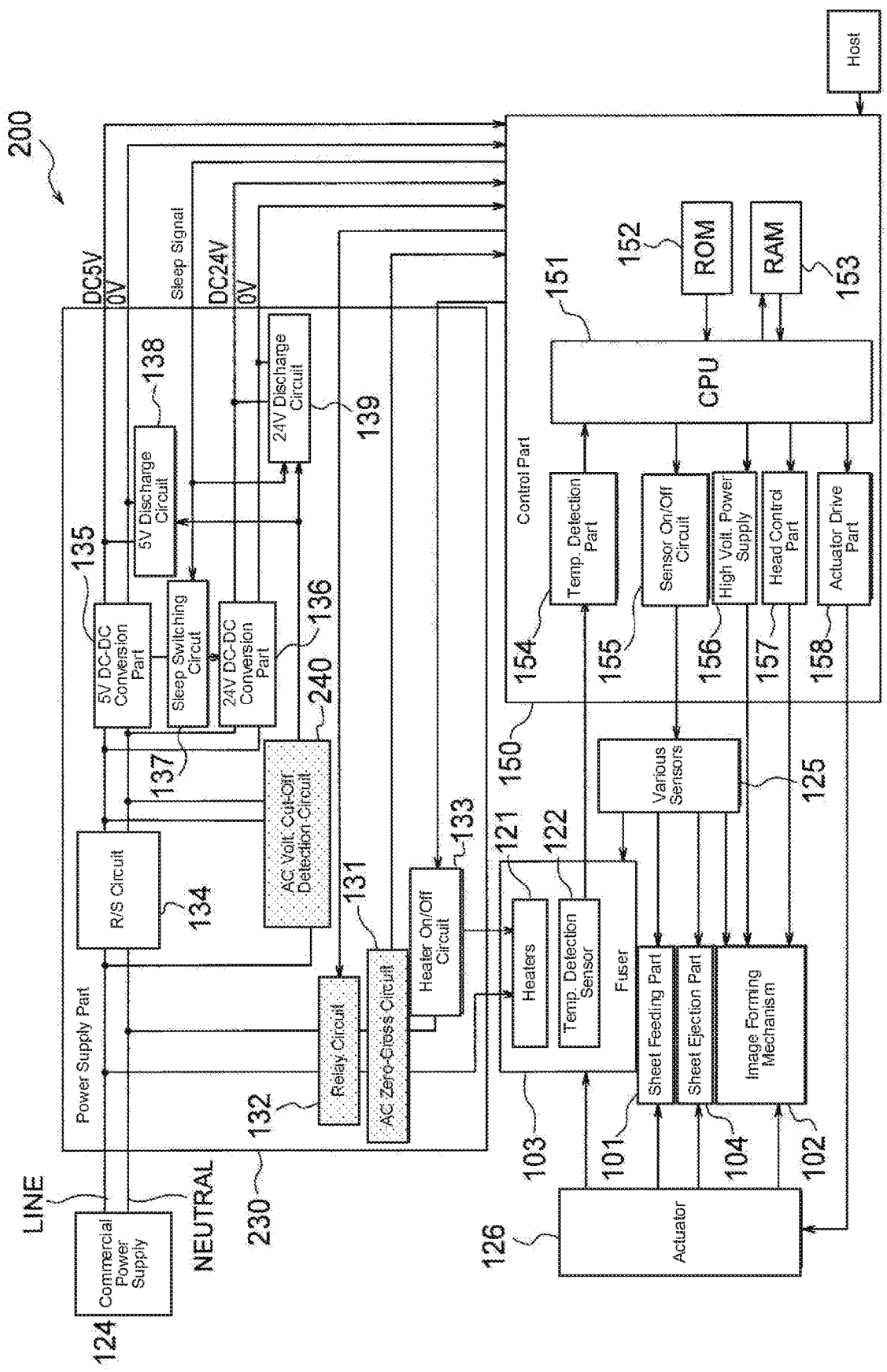
FIG. 8 is a block diagram showing schematically the configuration of the control system of an image forming apparatus of Embodiment 2.

FIG. 8 is a block diagram showing schematically the configuration of the control system of the image forming apparatus 200 of Embodiment 2. The image forming apparatus 200 of Embodiment 2 includes the sheet feeding part 101, the image forming mechanism 102, the fuser 103, the sheet ejection part 104, a power supply part 230, and a control part 150. In FIG. 8, detailed explanations on the same parts as in FIG. 5 are omitted by giving them the same codes as in FIG. 5.

In the power supply part 230 in Embodiment 2, the connection of an AC voltage cut-off detection circuit 240 to the pre-stage of a rectifying/smoothing circuit 134 is only on the LINE side.

Figure 9:
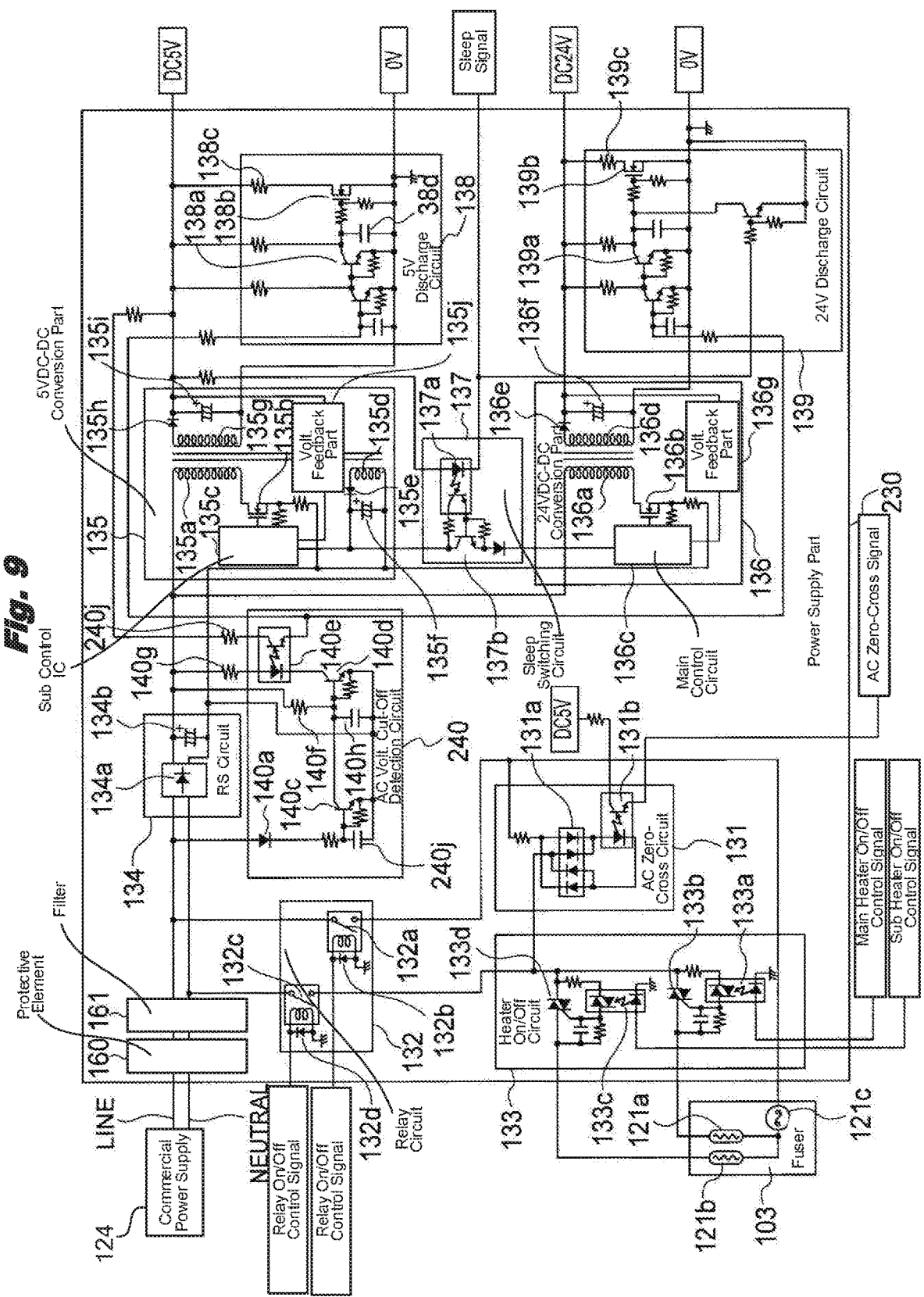
FIG. 9 is a circuit diagram showing the detailed configuration of a power supply part in Embodiment 2.

FIG. 9 is a circuit diagram showing the detailed configuration of the power supply part 230 in Embodiment 2. The power supply part 230 is provided with a protective element 160, a filter 161, the AC zero-cross circuit 131, the relay circuit 132, a heater on/off circuit 133, the rectifying/smoothing circuit 134, a 5V DC-DC conversion part 135, a 24V DC-DC conversion part 136, a sleep switching circuit 137, a 5V discharge circuit 138, a 24V discharge circuit 139, and an AC voltage cut-off detection circuit 140. Here, mainly explained are differences from the power supply part 130 in Embodiment 1 shown in FIG. 6.

The AC voltage cut-off detection circuit 240 of Embodiment 2 has a rectifying diode 140a connected to the LINE side of the pre-stage of the rectifying/smoothing circuit 134. The cathode of the rectifying diode 140a is connected to the base of a transistor 140c. The rectifying diode 140a is a rectifying element that rectifies the AC voltage. Here, the AC voltage is half-wave rectified by the rectifying diode 140a.

Although in Embodiment 2 the rectifying diode 140a is connected to the LINE side only, it can also be connected to the NEUTRAL side only.

As stated above, as opposed to Embodiment 1 shown in FIG. 6, the AC voltage applied to the AC voltage cut-off detection circuit 240 is half-wave rectified instead of full-wave rectified. Note that although the constant of the base resistor of the transistor 140c is changed, the number of parts can be reduced.

Figure 10:
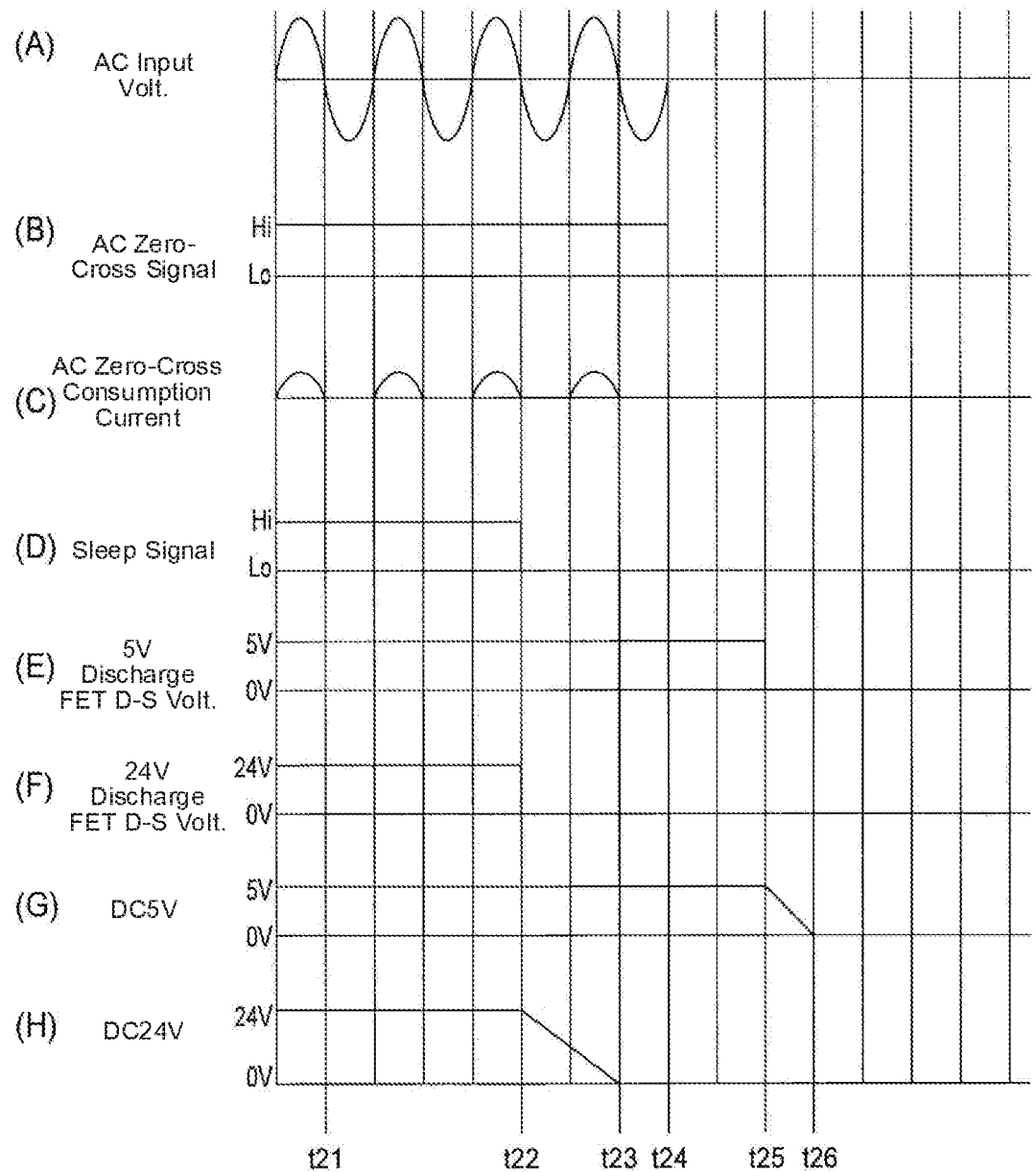
FIG. 10, which includes (A)-(H), is timing charts for explaining operations in the power supply part in Embodiment 2.

(A)-(H) of FIG. 10 are timing charts for explaining operations in the power supply part 230 in Embodiment 2. Explained in (A)-(H) of FIG. 10 are operations when moving into sleep that is an energy-saving mode and when the AC voltage is cut off. The horizontal axes in FIG. 10(A)-(H) indicate time, the vertical axes in FIGS. 10(A), 10(B), and 10(D)-10(H) indicate voltage, and the vertical axis in FIG. 10(C) indicates current.

An AC input voltage shown in FIG. 10(A) is an AC voltage outputted from a commercial power supply 124, in other words an AC voltage inputted to the power supply part 230. An AC off signal shown in FIG. 10(B) is a signal outputted from the AC voltage cut-off detection circuit 240. The AC off signal indicates at Hi that the AC input voltage is supplied, and indicates at Lo that the AC input voltage is cut off. An AC off circuit consumption current shown in FIG. 10(C) is a current consumed by the AC voltage cut-off detection circuit 240. The value of the AC off circuit consumption current is determined by the base current and the collector current of the transistor 140c of the AC voltage cut-off detection circuit 240.

A sleep signal shown in FIG. 10(D) is a signal outputted from the control part 150 to the power supply part 230. The sleep signal indicates a standby mode at Hi and a sleep mode at Lo. By moving from the standby mode to the sleep mode, the operation of the 24V DC-DC conversion part 136 is turned off, saving energy.

A 5V discharge FET D-S voltage shown in FIG. 10(E) indicates the voltage between the drain terminal and the source terminal of a 5V discharge FET 138b. A 24V discharge FET D-S voltage shown in FIG. 10(F) indicates the voltage between the drain terminal and the source terminal of a 24V discharge FET 139b.

DC 5 V shown in FIG. 10(G) indicates an output voltage outputted from the power supply part 230 to the control part 150. DC 24 V shown in FIG. 10(H) indicates an output voltage outputted from the power supply part 230 to the control part 150.

Next, operations are explained using FIG. 10 in the order of time t21 through time t26 indicated on the horizontal axis. At time t21, FIGS. 10(A)-10(H) show waveforms during the standby mode. As the operation of the image forming apparatus 200, it is a state of waiting for printing. Here, because the transistor 140c of the AC voltage cut-off detection circuit 240 is on, no current flows to a photocoupler 140e, and the secondary phototransistor of the photocoupler 140e is off. Therefore, the AC off signal shown in FIG. 10(B) is in a state of retaining Hi.

Because the connection of the AC voltage cut-off detection circuit 240 to the pre-stage of the rectifying/smoothing circuit 134 is on the LINE side only, the AC off circuit consumption current shown in FIG. 10(C) becomes a half-wave rectified waveform. Note that in Embodiment 2 a half-wave rectified AC input voltage is inputted to the transistor 140c, by a charge accumulated in a capacitor 240i connected to the base of the transistor 140c, the transistor 140c is maintained on. In order to make the effective current the same as in the full-wave rectification case, the AC off circuit consumption current shown in FIG. 10(C) has twice as high peaks as the AC off circuit consumption current shown in FIG. 7(C).

The sleep signal shown in FIG. 10(D) maintains the Hi state. The output voltage shown in FIG. 10(G) shows DC 5 V, and the output voltage shown in FIG. 10(H) shows DC 24 V. At this time, the secondary photodiode of a photocoupler 137a of the sleep switching circuit 137 is on, and a transistor 137b is on. Therefore, the rectified and smoothed voltage of a sub-primary auxiliary winding 135d of the 5V DC-DC conversion part 135 is supplied to the power supply terminal of a main control IC 136c of the 24V DC-DC conversion part 136. Also, because the 5V discharge FET 138b is off, as shown in FIG. 10(E), the 5V FET D-S voltage is 5 V. Because the 24V discharge FET 139b is similarly off, as shown in FIG. 10(F), the 24V discharge FET D-S voltage is 24 V. Therefore, no current flows to a discharge resistor 138c or 139c.

At time t22, by the standby mode continuing for a certain length of time, the image forming apparatus 200 moves into the sleep mode. The AC off signal shown in FIG. 10(B) does not change. In the same manner, the AC off circuit consumption current shown in FIG. 10(C) does not change, either.

As shown in FIG. 10(D), the sleep signal outputted from the control part 150 switches from Hi to Lo. Then, the secondary photodiode of the photocoupler 137a of the sleep switching circuit 137 turns off, and the transistor 137b turns off, thereby cutting off the supply of the rectified and smoothed voltage of the sub-primary auxiliary winding 135d of the 5V DC-DC conversion part 135 to the power supply terminal of the main control IC 136c of the 24V DC-DC conversion part 136. In other words, because the gate voltage input to a main FET 136b of the 24V DC-DC conversion part 136 stops, the operation of the 24V DC-DC conversion part 136 stops, and as shown in FIG. 10(H), the DC 24V output starts to drop. At the same time, by the sleep signal outputted from the control part 150, the discharge FET 139b of the 24V discharge circuit 139 turns on, a current flows to a discharge resistor 139c, accelerating the drop in the DC 24V output, and the output voltage becomes 0 V at time t23.

At time t24, due to a power outage, turning off an unshown power switch of the image forming apparatus 200, or pulling off an AC cable to the image forming apparatus 200, the AC input voltage is cut off as shown in FIG. 10(A).

Once the AC input voltage is cut off, the transistor 140c of the AC voltage cut-off detection circuit 240 turns off, and the transistor 140d turns on, thereby a current flows to the primary photodiode of the photocoupler 140e. Being connected to the post-stage of the rectifying/smoothing circuit 134, the voltage supply source of the photocoupler 140e is the remaining charge of an electrolytic capacitor 134b for smoothing. Also, because the AC input voltage is cut off, even if a current flows to the primary photodiode of the photocoupler 140e, no AC consumption current occurs. By the photocoupler 140e turning on, as shown in FIG. 10(B), the AC off signal switches from Hi to Lo.

Immediately after the AC input voltage cut-off, as shown in FIG. 10(E), the 5V discharge FET 138b of the 5V discharge circuit 138 retains 5 V. This is because the apparatus operation needs to be continued through a short-time power outage for about 20 ms for example. As an example of the method to retain power, as shown in FIG. 9, a capacitor 138d can be connected to the gate of the 5V discharge FET 138b, providing it with the time constant of a resistor and the capacitor 138d to delay the turn-off of the 5V discharge FET 138b. Also, as shown in FIG. 9, a capacitor 140h can be connected to the base of the transistor 140d of the AC voltage cut-off detection circuit 240, providing it with the time constant of a resistor and the capacitor 140h to delay the turn-off of the 5V discharge FET 138b.

At time t25, after a predetermined length of time passed, the 5V discharge FET 138b of the 5V discharge circuit 138 turns on, the 5V discharge FET D-S voltage becomes 0 V as shown in FIG. 10(E), and a current flows to the discharge resistor 138c, accelerating the drop in the DC 5V output. Then, at time t26 the output voltage becomes 0 V as shown in FIG. 10(G).

As stated above, by the image forming apparatus 200 of Embodiment 2 also, because the transistor 140c of the AC voltage cut-off detection circuit 240 is connected to the pre-stage of the rectifying/smoothing circuit 134, in comparison with the photocoupler 131b in the comparative example, the power consumed for detecting an AC voltage cut-off can be suppressed. Also, because the photocoupler 140e installed for notifying that the AC voltage is cut off is connected to the post-stage of the rectifying/smoothing circuit 134, its voltage supply source is the remaining charge of the electrolytic capacitor 134b for smoothing, therefore no AC consumption current occurs.

Embodiment 3

As shown in FIG. 1, in the same manner as in Embodiment 1, an image forming apparatus 300 of Embodiment 3 is provided with a sheet feeding part 101, an image forming mechanism 102, a fuser 103, and a sheet ejection part 104.

Figure 11:
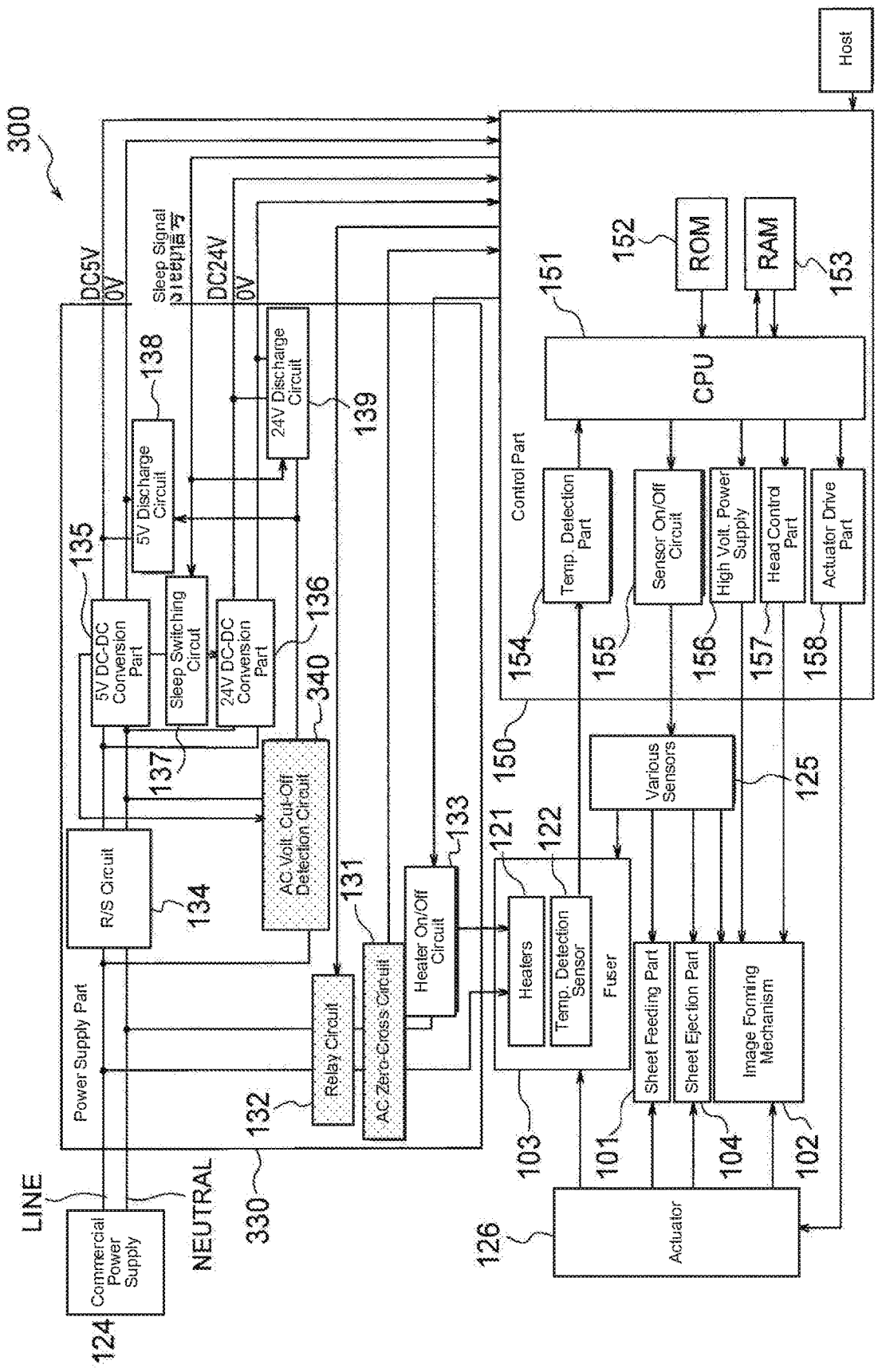
FIG. 11 is a block diagram showing schematically the configuration of the control system of an image forming apparatus of Embodiment 3.

FIG. 11 is a block diagram showing schematically the configuration of the control system of the image forming apparatus 300 of Embodiment 3. The image forming apparatus 300 of Embodiment 3 includes the sheet feeding part 101, the image forming mechanism 102, the fuser 103, the sheet ejection part 104, a power supply part 330, and a control part 150. In FIG. 11, detailed explanations on the same parts as in FIG. 8 are omitted by giving them the same codes as in FIG. 8.

The power supply part 330 in Embodiment 3 is different from the power supply part 230 in Embodiment 2 in that an AC voltage cut-off detection circuit 340 is connected to the post-stage of a 5V DC-DC conversion part 135.

Figure 12:
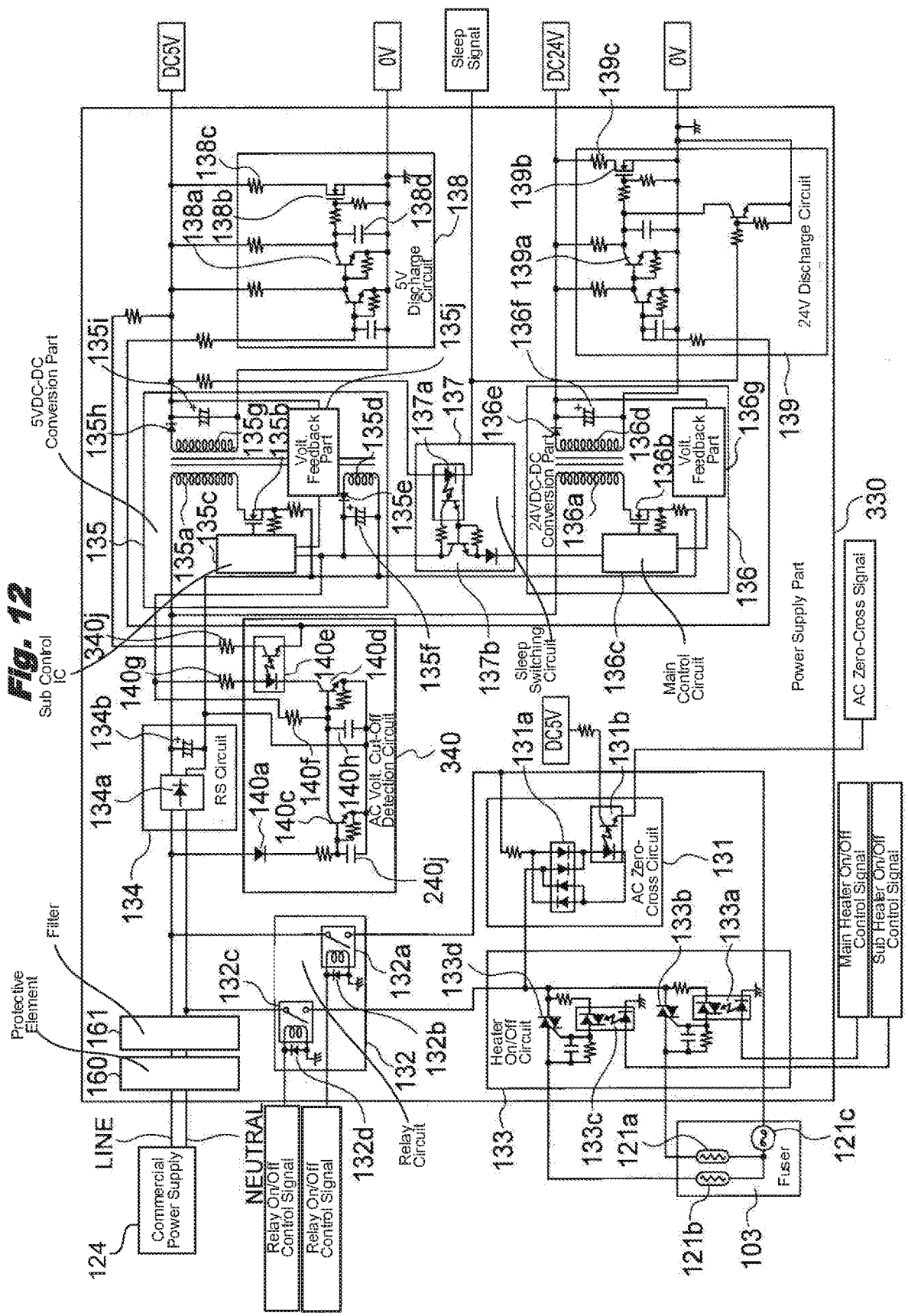
FIG. 12 is a circuit diagram showing the detailed configuration of a power supply part in Embodiment 3.

FIG. 12 is a circuit diagram showing the detailed configuration of the power supply part 330 in Embodiment 3. The power supply part 330 is provided with a protective element 160, a filter 161, an AC zero-cross circuit 131, a relay circuit 132, a heater on/off circuit 133, a rectifying/smoothing circuit 134, the 5V DC-DC conversion part 135, a 24V DC-DC conversion part 136, a sleep switching circuit 137, a 5V discharge circuit 138, a 24V discharge circuit 139, and an AC voltage cut-off detection circuit 340. Here, mainly explained are differences from the power supply part 230 in Embodiment 2 shown in FIG. 9.

The AC voltage cut-off detection circuit 340 provides a base resistor 140f of a transistor 140d and the primary photodiode of a photocoupler 140e with a voltage rectified and smoothed by a sub-primary auxiliary winding 135d that is the primary side of the 5V DC-DC conversion part 135 in the post-stage of the rectifying/smoothing circuit 134.

According to the above, if connected to the post-stage of the rectifying/smoothing circuit 134 as in the AC voltage cut-off detection circuit 240 of Embodiment 2, a voltage supplied to the AC voltage cut-off detection circuit 240 becomes √2 times the AC input voltage, becoming as high a voltage as 390 V if a PFC circuit is used. On the other hand, as in Embodiment 3, by being connected to the post-stage of the sub-primary auxiliary winding 135d, the voltage supplied to the AC voltage cut-off detection circuit 340 can be made as low as several ten V. Therefore, obtained is an effect that the size of the photodiode current limiting resistor 140g of the photocoupler 140e can be reduced. Also, although in Embodiment 3 the AC voltage cut-off detection circuit 340 is connected to the post-stage of the sub-primary auxiliary winding 135d, depending on the configuration the AC voltage cut-off detection circuit 340 can be connected to an unshown main primary auxiliary winding.

Figure 13:
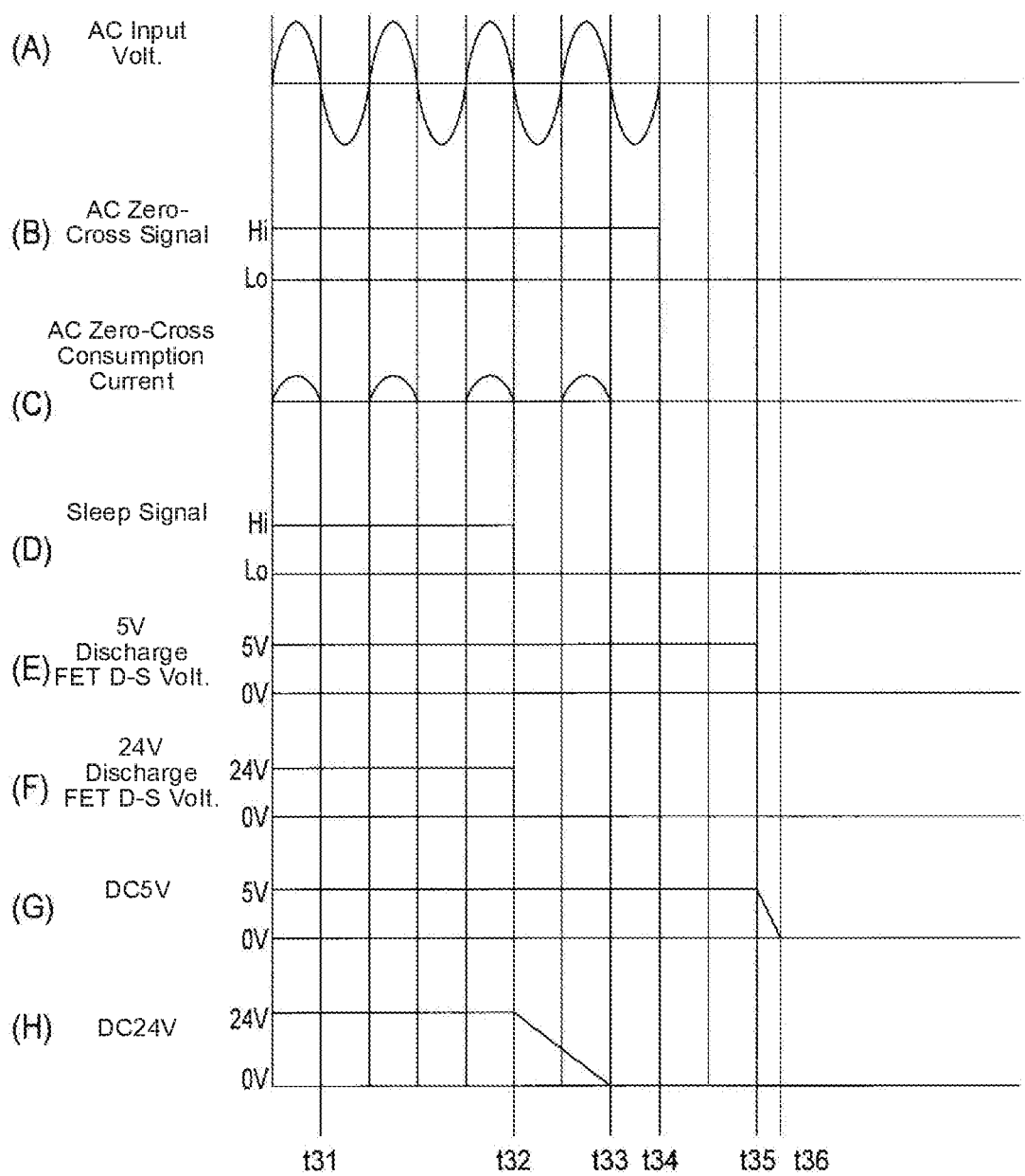
FIG. 13, which includes (A)-(H), is timing charts for explaining operations in the power supply part in Embodiment 3.

(A)-(H) of FIG. 13 are timing charts for explaining operations in the power supply part 330 in Embodiment 3. Explained in (A)-(H) of FIG. 13 are operations when moving into sleep that is an energy-saving mode and when the AC voltage is cut off. The horizontal axes in FIGS. 13(A)-13(H) indicate time, the vertical axes in FIGS. 13(A), 13(B), and 13(D)-13(H) indicate voltage, and the vertical axis in FIG. 13(C) indicates current.

The AC input voltage shown in FIG. 13(A) is an AC voltage outputted from a commercial power supply 124, in other words an AC voltage inputted to the power supply part 330. An AC off signal shown in FIG. 13(B) is a signal outputted from the AC voltage cut-off detection circuit 340. The AC off signal indicates at Hi that the AC input voltage is supplied, and indicates at Lo that the AC input voltage is cut off. An AC off circuit consumption current shown in FIG. 13(C) is a current consumed by the AC voltage cut-off detection circuit 340. The value of the AC off circuit consumption current is determined by the base current and the collector current of a transistor 140c of the AC voltage cut-off detection circuit 340.

A sleep signal shown in FIG. 13(D) is a signal outputted from the control part 150 to the power supply part 330. The sleep signal indicates a standby mode at Hi and a sleep mode at Lo. By moving from the standby mode to the sleep mode, the operation of the 24V DC-DC conversion part 136 is turned off, saving energy.

A 5V discharge FET D-S voltage shown in FIG. 13(E) indicates the voltage between the drain terminal and the source terminal of a 5V discharge FET 138b. A 24V discharge FET D-S voltage shown in FIG. 13(F) indicates the voltage between the drain terminal and the source terminal of a 24V discharge FET 139b.

DC 5 V shown in FIG. 13(G) indicates an output voltage outputted from the power supply part 330 to the control part 150. DC 24 V shown in FIG. 13(H) indicates an output voltage outputted from the power supply part 330 to the control part 150.

Next, operations are explained using FIG. 13 in the order of time t31 through time t36 indicated on the horizontal axis. At time t31, FIGS. 13(A)-13(H) show waveforms during the standby mode. As the operation of the image forming apparatus 300, it is a state of waiting for printing. Here, because the transistor 140c of the AC voltage cut-off detection circuit 340 is on, no current flows to the photocoupler 140e, and the secondary phototransistor of the photocoupler 140e is off. Therefore, the AC off signal shown in FIG. 13(B) is in a state of retaining Hi.

Because the connection of the AC voltage cut-off detection circuit 340 to the pre-stage of the rectifying/smoothing circuit 134 is on the LINE side only, the AC off circuit consumption current shown in FIG. 13(C) becomes a half-wave rectified waveform. In order to make the effective current the same as in the full-wave rectification case, the AC off circuit consumption current shown in FIG. 13(C) has twice as high peaks as in the AC off circuit consumption current shown in FIG. 7(C).

The sleep signal shown in FIG. 13(D) maintains the Hi state. The output voltage shown in FIG. 13(G) shows DC 5 V, and the output voltage shown in FIG. 13(H) shows DC 24 V. At this time, the secondary photodiode of a photocoupler 137a of the sleep switching circuit 137 is on, and a transistor 137b is on. Therefore, the rectified and smoothed voltage of a sub-primary auxiliary winding 135d of the 5V DC-DC conversion part 135 is supplied to the power supply terminal of a main control IC 136c of the 24V DC-DC conversion part 136. Also, because the 5V discharge FET 138b is off, as shown in FIG. 13(E), the 5V FET D-S voltage is 5 V. Because the 24V discharge FET 139b is similarly off, as shown in FIG. 13(F), the 24V discharge FET D-S voltage is 24 V. Therefore, no current flows to a discharge resistor 138c or 139c.

At time t32, by the standby mode continuing for a certain length of time, the image forming apparatus 300 moves into the sleep mode. The AC off signal shown in FIG. 13(B) does not change. In the same manner, the AC off circuit consumption current shown in FIG. 13(C) does not change, either.

As shown in FIG. 13(D), the sleep signal outputted from the control part 150 switches from Hi to Lo. Then, the secondary photodiode of the photocoupler 137a of the sleep switching circuit 137 turns off, and the transistor 137b turns off, thereby cutting off the supply of the rectified and smoothed voltage of the sub-primary auxiliary winding 135d of the 5V DC-DC conversion part 135 to the power supply terminal of the main control IC 136c of the 24V DC-DC conversion part 136. In other words, because the gate voltage input to a main FET 136b of the 24V DC-DC conversion part 136 stops, the operation of the 24V DC-DC conversion part 136 stops, and as shown in FIG. 13(H), the DC 24V output starts to drop. At the same time, by the sleep signal outputted from the control part 150, the discharge FET 139b of the 24V discharge circuit 139 turns on, a current flows to a discharge resistor 139c, accelerating the drop in the DC 24V output, and the output voltage becomes 0 V at time t33.

At time t34, due to a power outage, turning off an unshown power switch of the image forming apparatus 300, or pulling off an AC cable to the image forming apparatus 300, the AC input voltage is cut off as shown in FIG. 13(A).

Once the AC input voltage is cut off, the transistor 140c of the AC voltage cut-off detection circuit 340 turns off, and the transistor 140d turns on, thereby a current flows to the primary photodiode of the photocoupler 140e. Being connected to the post-stage of the rectifying/smoothing circuit 134, the voltage supply source of the photocoupler 140e is the remaining charge of an electrolytic capacitor 134b for smoothing. Also, because the AC input voltage is cut off, even if a current flows to the primary photodiode of the photocoupler 140e, no AC consumption current occurs. By the photocoupler 140e turning on, as shown in FIG. 13(B), the AC off signal switches from Hi to Lo.

Immediately after the AC input voltage cut-off, as shown in FIG. 13(E), the 5V discharge FET 138b of the 5V discharge circuit 138 retains 5 V. This is because the apparatus operation needs to be continued through a short-time power outage for about 20 ms for example. As an example of the method to retain power, as shown in FIG. 12, a capacitor 138d can be connected to the gate of the 5V discharge FET 138b, providing it with the time constant of a resistor and the capacitor 138d to delay the turn-off of the 5V discharge FET 138b. Also, as shown in FIG. 12, a capacitor 140h can be connected to the base of the transistor 140d of the AC voltage cut-off detection circuit 340, providing it with the time constant of a resistor and the capacitor 140h to delay the turn-off of the 5V discharge FET 138b.

At time t35, after a predetermined length of time passed, the 5V discharge FET 138b of the 5V discharge circuit 138 turns on, the 5V discharge FET D-S voltage becomes 0 V as shown in FIG. 13(E), and a current flows to the discharge resistor 138c, accelerating the drop in the DC 5V output.

Here, explained is the difference between the DC 5V output dropping time shown in the timing chart in FIG. 13 and the DC 5V output dropping time shown in the timing chart in FIG. 10. In Embodiment 2, because the photocoupler 140e of the AC voltage cut-off detection circuit 240 is connected to the post-stage of the rectifying/smoothing circuit 134, the applied voltage to the photocoupler 140e is high, therefore the resistance value of a current limiting resistor 240j of the primary photodiode of the photocoupler 140e needs to be increased. By the resistance value increasing, the current value of a current flowing to the primary photodiode decreases, thereby time for a current to flow to the discharge resistor 138c of the 5V discharge circuit 138 decreases, limiting the acceleration of the drop in the DC 5V output. On the other hand, in Embodiment 3, the photocoupler 140e of the AC voltage cut-off detection circuit 340 is connected to an electric wire after rectification and smoothing in the sub-primary auxiliary winding 135d of the 5V DC-DC conversion part 135, the voltage applied to the photocoupler 140e is low, which allows decreasing the resistance value of the current limiting resistor 340j of the primary photodiode of the photocoupler 140e. Therefore, the current value of the current flowing to the primary photodiode can be set higher, increasing time for a current to flow to the discharge resistor 138c of the 5V discharge circuit 138. According to the above, in Embodiment 3, the drop in the DC 5V output can be accelerated more than in Embodiment 2. At time t36, as shown in FIG. 13(G), the output voltage becomes 0 V.

As stated above, in Embodiment 3, because the photocoupler 140e of the AC voltage cut-off detection circuit 340 is connected to the post-stage of the sub-primary auxiliary winding 135d of the 5V DC-DC conversion part 135, the drop in the DC 5V output can be accelerated, allowing miniaturization of a current limiting resistor 140g of the photocoupler 140e.

Note that in the same manner as in Embodiment 1, a rectifying diode 140b connected to the NEUTRAL side can be connected to the base of the transistor 140c in Embodiment 3 as well.

Embodiment 4

As shown in FIG. 1, in the same manner as in Embodiment 1, an image forming apparatus 400 of Embodiment 4 is provided with a sheet feeding part 101, an image forming mechanism 102, a fuser 103, and a sheet ejection part 104.

Figure 14:
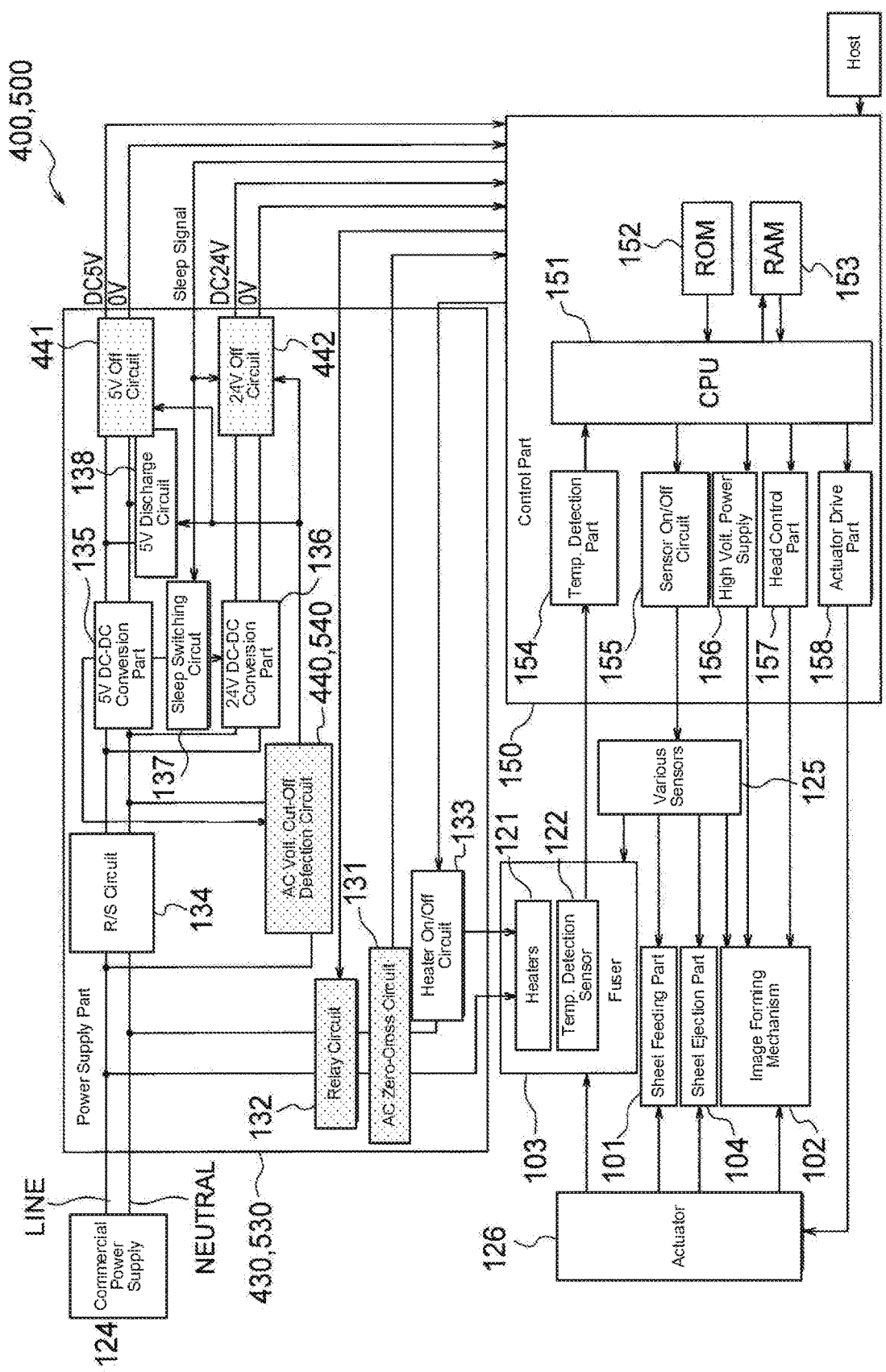
FIG. 14 is a block diagram showing schematically the configuration of the control system of an image forming apparatus of Embodiment 4.

FIG. 14 is a block diagram showing schematically the configuration of the control system of the image forming apparatus 400 of Embodiment 4. The image forming apparatus 400 of Embodiment 4 includes the sheet feeding part 101, the image forming mechanism 102, the fuser 103, the sheet ejection part 104, a power supply part 430, and a control part 150. In FIG. 14, detailed explanations on the same parts as in FIG. 11 are omitted by giving them the same codes as in FIG. 11.

The power supply part 430 in Embodiment 4 is different from the power supply part 330 in Embodiment 3 in that a 5V off circuit 441 is connected to the post-stage of a 5V DC-DC conversion part 135, that a 24V off circuit 442 is connected to the post-stage of a 24V DC-DC conversion part 136, and that no 24V discharge circuit is installed. Note that the 5V off circuit 441 and the 24V off circuit 442 are also connected to an AC voltage cut-off detection circuit 440. Here, the 5V discharge circuit 138, the 5V off circuit 441, and the 24V off circuit 442 are voltage processing circuits that operate when the AC voltage cut-off detection circuit 440 has detected an AC voltage cut-off. Then, a photocoupler 140e is a signal transmitting element that sends a signal indicating that the AC voltage is cut-off to the 5V discharge circuit 138, the 5V off circuit 441, and the 24V off circuit 442.

Figure 15:
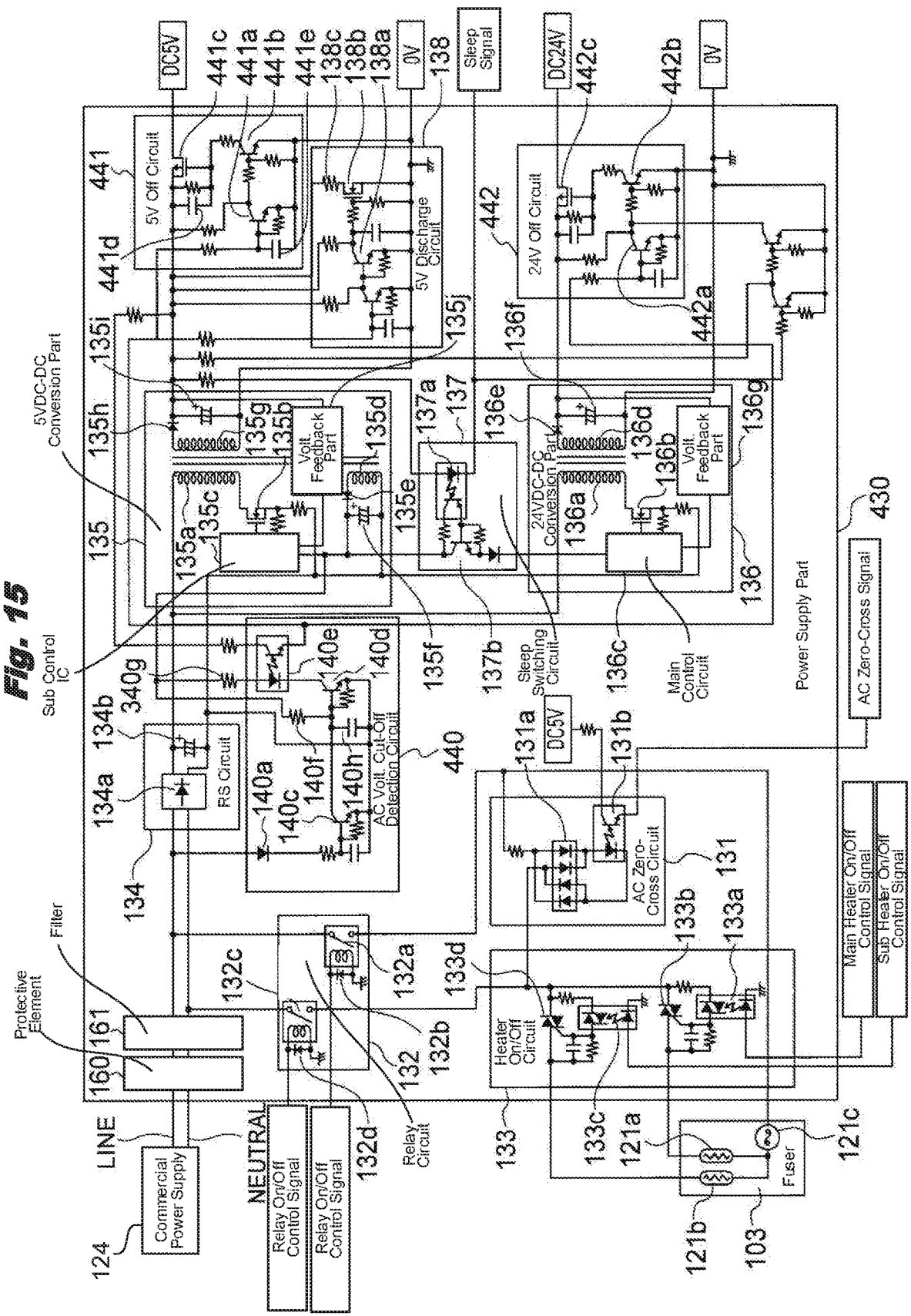
FIG. 15 is a circuit diagram showing the detailed configuration of a power supply part in Embodiment 4.

FIG. 15 is a circuit diagram showing the detailed configuration of the power supply part 430 in Embodiment 4. The power supply part 430 is provided with a protective element 160, a filter 161, an AC zero-cross circuit 131, a relay circuit 132, a heater on/off circuit 133, a rectifying/smoothing circuit 134, the 5V DC-DC conversion part 135, the 24V DC-DC conversion part 136, a sleep switching circuit 137, a 5V discharge circuit 138, the AC voltage cut-off detection circuit 440, the 5V off circuit 441, and the 24V off circuit 442. Here, mainly explained are differences from the power supply part 330 in Embodiment 3 shown in FIG. 12.

The emitter of the secondary phototransistor of the AC voltage cut-off detection circuit 440 and the base of a transistor 441a of the 5V off circuit 441 are connected. In the 5V off circuit 441, the collector of the transistor 441a and the base of a transistor 441b are connected. Also, the collector of the transistor 441b and the gate of a 5V off FET 441c are connected.

Also, the emitter of the secondary phototransistor of the AC voltage cut-off circuit 440 and the base of a transistor 442a of the 24V off circuit 442 are connected. In the 24V off circuit 442, the collector of the transistor 442a and the base of a transistor 442b are connected. Also, the collector of the transistor 442b and the gate of a 24V off FET 442c are connected.

According to the above, when an AC voltage cut-off is detected, the 5V off FET 441c and the 24V off FET 442c turn off, thereby a drop in an output voltage can be accelerated. In using a discharge circuit, because a discharge resistor needs to be kept within allowable temperature even when continuously powered due to a drain-source short circuiting of a discharge FET, the discharge resistor becomes larger. However, by using the 5V off FET 441c and the 24V off FET 442c, no large discharge resistor is needed, allowing miniaturization to be expected.

Figure 16:
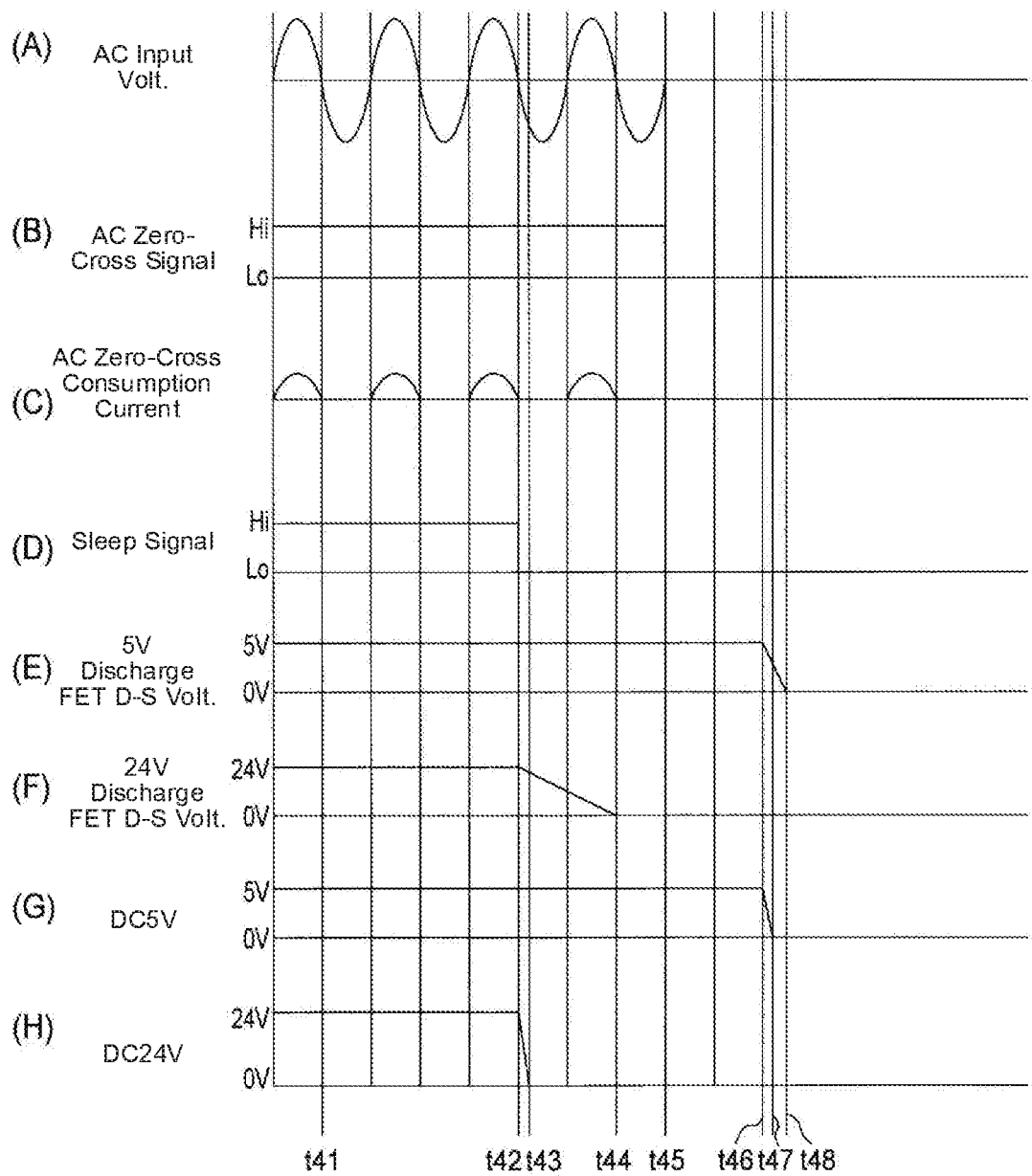
FIG. 16, which includes (A)-(H), is timing charts for explaining operations in the power supply part in Embodiment 4.

(A)-(H) of FIG. 16 are timing charts for explaining operations in the power supply part 430 in Embodiment 4. Explained in (A)-(H) of FIG. 16 are operations when moving into sleep that is an energy-saving mode and when an AC voltage is cut off. The horizontal axes in FIGS. 16(A)-16(H) indicate time, the vertical axes in FIGS. 16(A), 16(B), and 16(D)-16(H) indicate voltage, and the vertical axis in FIG. 16(C) indicates current.

An AC input voltage shown in FIG. 16(A) is an AC voltage outputted from a commercial power supply 124, in other words an AC voltage inputted to the power supply part 430. An AC off signal shown in FIG. 16(B) is a signal outputted from the AC voltage cut-off detection circuit 440. The AC off signal indicates at Hi that the AC input voltage is supplied, and indicates at Lo that the AC input voltage is cut off. An AC off circuit consumption current shown in FIG. 16(C) is a current consumed by the AC voltage cut-off detection circuit 440. The value of the AC off circuit consumption current is determined by the base current and the collector current of a transistor 140c of the AC voltage cut-off detection circuit 440.

A sleep signal shown in FIG. 16(D) is a signal outputted from the control part 150 to the power supply part 430. The sleep signal indicates a standby mode at Hi and a sleep mode at Lo. By moving from the standby mode to the sleep mode, the operation of the 24V DC-DC conversion part 136 is turned off, saving energy.

5V off FET pre-stage DC 5 V shown in FIG. 16(E) indicates a voltage supplied to the source side of the 5V off FET 441c. 24V off FET pre-stage DC 24 V shown in FIG. 16(F) indicates a voltage supplied to the source side of the 24V off FET 442c.

DC 5 V shown in FIG. 16(G) indicates an output voltage outputted from the power supply part 430 to the control part 150. DC 24 V shown in FIG. 13(H) indicates an output voltage outputted from the power supply part 430 to the control part 150.

Next, operations are explained using FIG. 16 in the order of time t41 through time t48 indicated on the horizontal axis. At time t41, FIGS. 16(A)-16(H) show waveforms during the standby mode. As the operation of the image forming apparatus 400, it is a state of waiting for printing. Here, because the transistor 140c of the AC voltage cut-off detection circuit 440 is on, no current flows to the photocoupler 140e, and the secondary phototransistor of the photocoupler 140e is off. Therefore, the AC off signal shown in FIG. 16(B) is in a state of retaining Hi.

Because the connection of the AC voltage cut-off detection circuit 440 to the pre-stage of the rectifying/smoothing circuit 134 is on the LINE side only, the AC off circuit consumption current shown in FIG. 16(C) becomes a half-wave rectified waveform. In order to make the effective current the same as in the full-wave rectification case, the AC off circuit consumption current shown in FIG. 16(C) has twice as high peaks as in the AC off circuit consumption current shown in FIG. 7(C).

The sleep signal shown in FIG. 16(D) maintains the Hi state. The output voltage shown in FIG. 16(G) shows DC 5 V, and the output voltage shown in FIG. 16(H) shows DC 24 V. At this time, the secondary photodiode of a photocoupler 137a of the sleep switching circuit 137 is on, and a transistor 137b is on. Therefore, the rectified and smoothed voltage of a sub-primary auxiliary winding 135d of the 5V DC-DC conversion part 135 is supplied to the power supply terminal of a main control IC 136c of the 24V DC-DC conversion part 136. As shown in FIG. 16(E), the voltage supplied to the 5V off FET 441c is DC 5 V. Also, as shown in FIG. 16(F), the voltage supplied to the 24V off FET 442c is 24 V.

At time t42, by the standby mode continuing for a certain length of time, the image forming apparatus 400 moves into the sleep mode. The AC off signal shown in FIG. 16(B) does not change. In the same manner, the AC off circuit consumption current shown in FIG. 16(C) does not change, either.

As shown in FIG. 16(D), the sleep signal outputted from the control part 150 switches from Hi to Lo. Then, the secondary photodiode of the photocoupler 137a of the sleep switching circuit 137 turns off, and the transistor 137b turns off, thereby cutting off the supply of the rectified and smoothed voltage of the sub-primary auxiliary winding 135d of the 5V DC-DC conversion part 135 to the power supply terminal of the main control IC 136c of the 24V DC-DC conversion part 136. In other words, because the gate voltage input to a main FET 136b of the 24V DC-DC conversion part 136 stops, the operation of the 24V DC-DC conversion part 136 stops, the 24V off FET pre-stage DC 24V output starts to drop as shown in FIG. 16(F), and the DC 24V output starts to drop as shown in FIG. 16(H). At the same time, by the sleep signal outputted from the control part 150, the 24V off FET 442c of the 24V off circuit 442 turns off, the drop in the DC 24V output is accelerated, and the output voltage becomes 0 V at time t43.

At time t44, as shown in FIG. 16(F), the voltage supplied to the 24V off FET 442c becomes 0 V. Because Embodiment 4 is not provided with a 24V discharge circuit 139 as in Embodiments 1-3, its dropping time becomes longer than that of DC 24 V shown in FIG. 16(H). Note that Embodiment 4 can also be provided with the 24V discharge circuit 139.

At time t45, due to a power outage, turning off an unshown power switch of the image forming apparatus 400, or pulling off an AC cable to the image forming apparatus 400, the AC input voltage is cut off as shown in FIG. 16(A).

Once the AC input voltage is cut off, the transistor 140c of the AC voltage cut-off detection circuit 440 turns off, and the transistor 140d turns on, thereby a current flows to the primary photodiode of the photocoupler 140e. Being connected to the post-stage of the rectifying/smoothing circuit 134, the voltage supply source of the photocoupler 140e is the remaining charge of an electrolytic capacitor 134b for smoothing. Also, because the AC input voltage is cut off, even if a current flows to the primary photodiode of the photocoupler 140e, no AC consumption current occurs. By the photocoupler 140e turning on, as shown in FIG. 16(B), the AC off signal switches from Hi to Lo.

Immediately after the AC input voltage cut-off, as shown in FIG. 16(G), the output of the 5V off circuit 441 retains 5 V. This is because the apparatus operation needs to be continued through a short-time power outage for about 20 ms for example. As an example of the method to retain power, as shown in FIG. 15, a capacitor 441d can be connected to the gate of the 5V off FET 441c, or a capacitor 441e can be connected to the base of the transistor 441a, providing it with the time constant of a resistor and the capacitor 441d or 441e to delay the turn-off of the 5V off FET 441c. Also, as shown in FIG. 15, a capacitor 140h can be connected to the base of the transistor 140d of the AC voltage cut-off detection circuit 440, providing it with the time constant of a resistor and the capacitor 140h to delay the turn-off of the 5V off FET 441c.

At time t46, after a predetermined length of time passed, the 5V off FET 441c of the 5V off circuit 441 turns off, accelerating the drop in the DC 5V output as shown in FIG. 16(G).

Here, explained is the difference from Embodiment 3 in the DC 5V output dropping time. In Embodiment 3, the photocoupler 140e of the AC voltage cut-off detection circuit 340 is connected to the electric wire that supplies a voltage after rectification and smoothing in the sub-primary auxiliary winding 135d of the 5V DC-DC conversion part 135, and after a predetermined length of time passed, the 5V discharge FET 138b of the 5V discharge circuit 138 turns on, the D-S voltage of the 5V discharge FET 138b becomes 0 V, and a current flows to the discharge resistor 138c, accelerating a drop in the DC 5V output.

On the other hand, in Embodiment 4, the photocoupler 140e of the AC voltage cut-off detection circuit 440 is connected to an electric wire that supplies a voltage after rectification and smoothing in the sub-primary auxiliary winding 135d of the 5V DC-DC conversion part 135, and after a predetermined length of time passed, the 5V off FET 441c of the 5V off circuit 441 turns off, accelerating a drop in the DC 5V output. In other words, because DC 5 V supplied to the control part 150 is cut off, the drop can be accelerated more than the drop by the 5V discharge circuit 138 in Embodiment 3.

At time t47, as shown in FIG. 16(G), the output voltage becomes 0 V. Also, at time t48, the voltage supplied to the 5V off FET 441c becomes 0 V. Because the 5V discharge circuit 138 is mounted also in Embodiment 4, the 5V off FET pre-stage DC 5V dropping time becomes shorter. Also, note that the 5V discharge circuit 138 need not be mounted in Embodiment 4.

As stated above, according to Embodiment 4, by being provided with the 5V off circuit 441 and the 24V off circuit 442, the DC output voltage drop can be accelerated.

Note that in the same manner as in Embodiment 1, a rectifying diode 140b connected to the NEUTRAL side can be connected to the base of the transistor 140c in Embodiment 4 as well.

Embodiment 5

As shown in FIG. 1, in the same manner as in Embodiment 1, an image forming apparatus 500 of Embodiment 5 is provided with a sheet feeding part 101, an image forming mechanism 102, a fuser 103, and a sheet ejection part 104.

As shown in FIG. 14, the image forming apparatus 500 of Embodiment 5 includes the sheet feeding part 101, the image forming mechanism 102, the fuser 103, the sheet ejection part 104, a power supply part 530, and a control part 150. The image forming apparatus 500 of Embodiment 5 is configured in the same manner as in Embodiment 4 except the power supply part 530.

Figure 17:
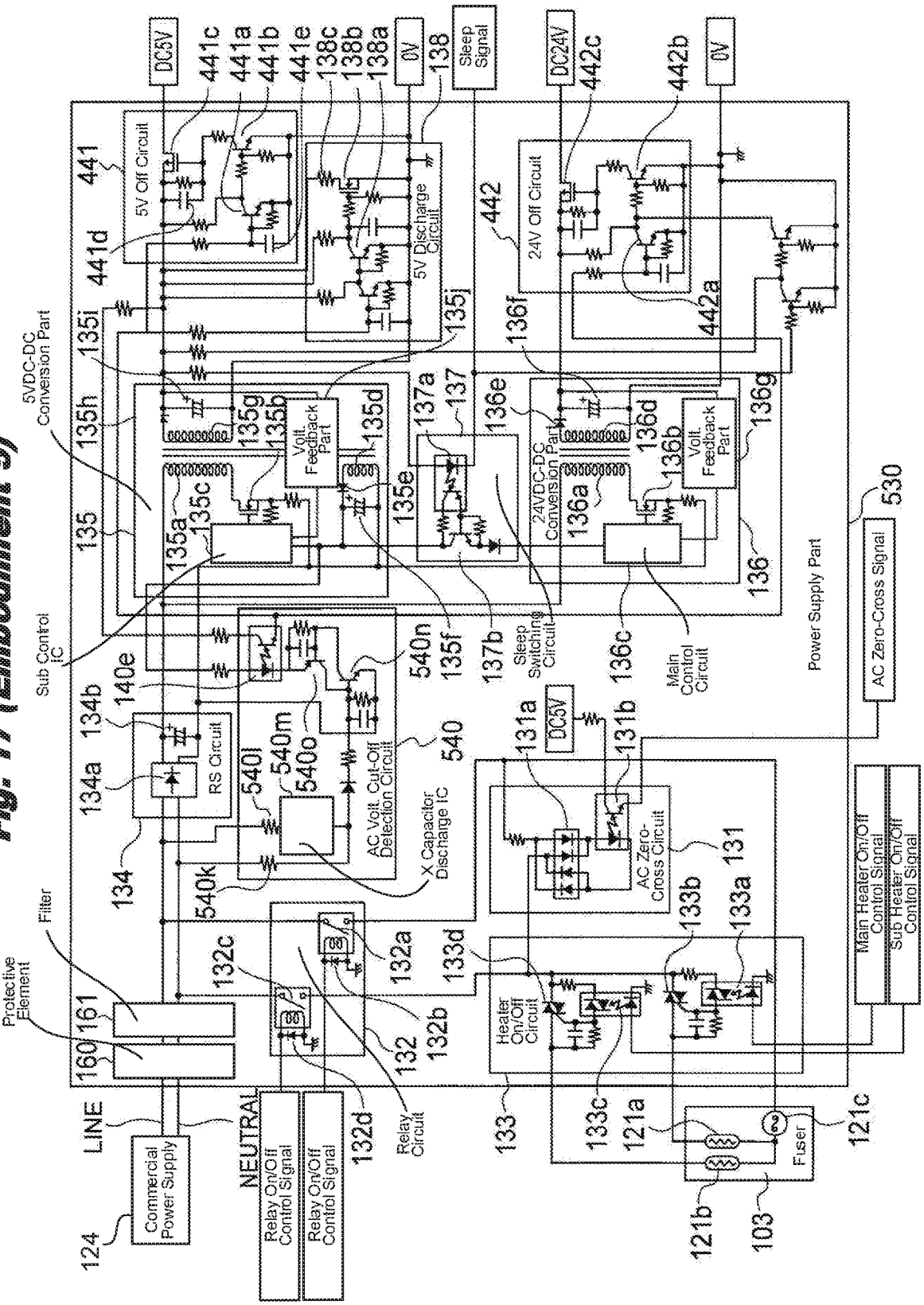
FIG. 17 is a circuit diagram showing the detailed configuration of a power supply part in Embodiment 5.

FIG. 17 is a circuit diagram showing the detailed configuration of the power supply part 530 in Embodiment 5. The power supply part 530 is provided with a protective element 160, a filter 161, an AC zero-cross circuit 131, a relay circuit 132, a heater on/off circuit 133, a rectifying/smoothing circuit 134, the 5V DC-DC conversion part 135, the 24V DC-DC conversion part 136, a sleep switching circuit 137, a 5V discharge circuit 138, the AC voltage cut-off detection circuit 540, a 5V off circuit 441, and a 24V off circuit 442. Here, mainly explained are differences from the power supply part 430 in Embodiment 4 shown in FIG. 15.

In the AC cut-off detection circuit 540 in Embodiment 5, resistors 540k and 540l are connected to the LINE side and the NEUTRAL side in the pre-stage of the rectifying/smoothing circuit 134. Also, an X capacitor discharge IC 540m is connected to the resistor 540l.

Here, explained is the X capacitor discharge IC 540m. It is assumed that the filter 161 uses an unshown film capacitor that connects its both ends to the LINE side and the NEUTRAL sides. This film capacitor is commonly called as X capacitor (primary capacitor). Although in general a discharge resistor is connected because the X capacitor needs to be discharged when an AC voltage is cut off conforming to the safety standard, by using the X capacitor discharge IC 540*m*, a current can flow to the discharge resistor only when the AC voltage is cut off, saving power.

In Embodiment 5, the X capacitor discharge IC 540*m* is connected to the base of a transistor 540*n*, the transistor 540*n* and a transistor 540*o* have a latch-circuit connection, and the transistor 540*o* and a photocoupler 140*e* are connected. According to the above, the X capacitor discharge IC 540*m* operates only when the AC voltage is cut off, and the photocoupler 140*e* remains powered by the latch circuit, therefore further power saving can be expected. In other words, the X capacitor discharge IC 540*m* functions as an operational circuit that operates the photocoupler 140*e* by receiving a power supply from the X capacitor when the AC voltage is cut off.

Note that as the X capacitor discharge IC 540*m*, CAPZero X capacitor discharge IC of Power Integrations, Inc., X capacitor discharge IC of NXP Semiconductors N. V., or the like can be used.

Figure 18:
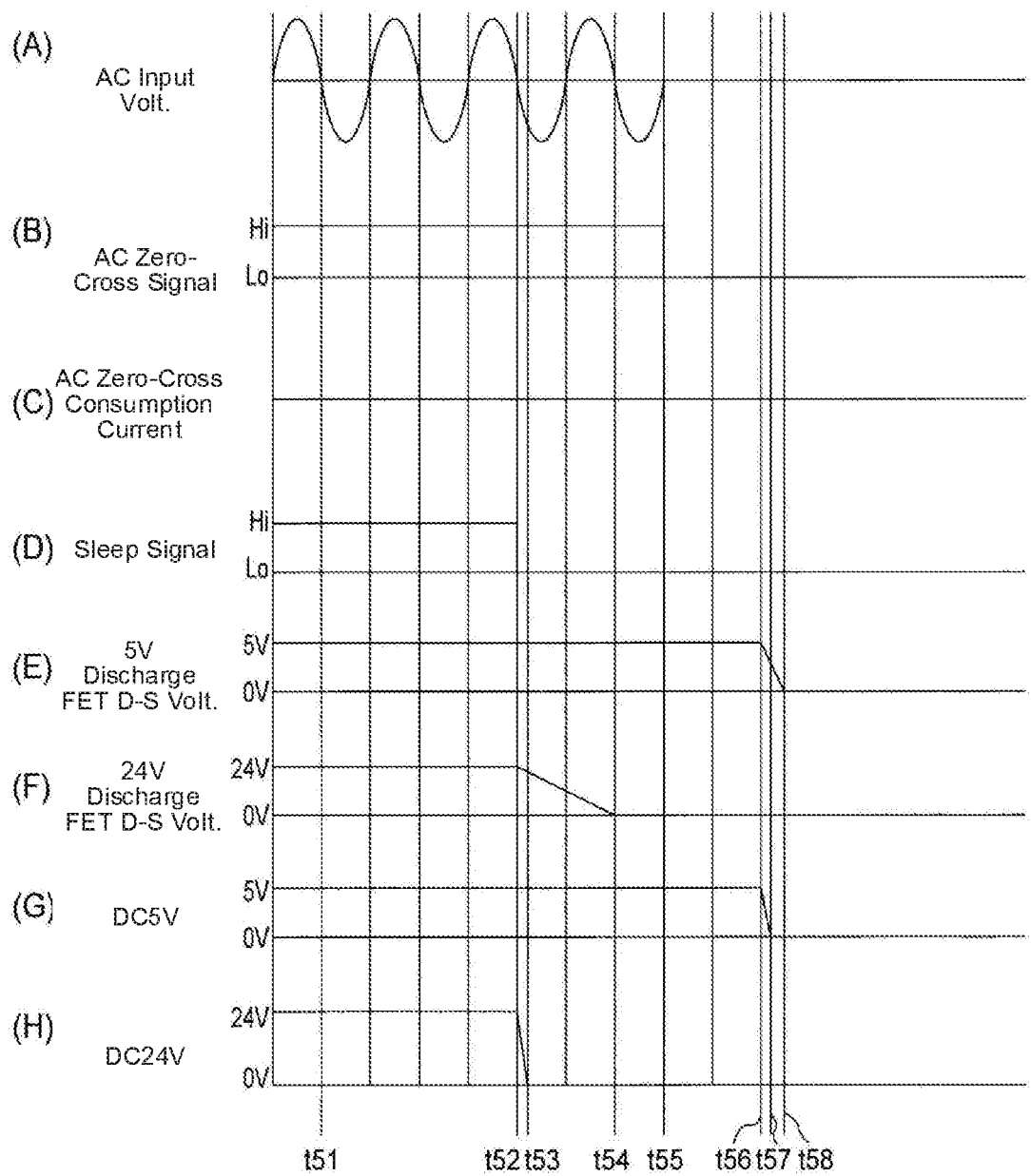
FIG. 18, which includes (A)-(H), is timing charts for explaining operations in the power supply part in Embodiment 5.

(A)-(H) of FIG. 18 are timing charts for explaining operations in the power supply part 530 in Embodiment 5. Explained in (A)-(H) of FIG. 18 are operations when moving into sleep that is an energy-saving mode and when the AC voltage is cut off. The horizontal axes in FIGS. 18(A)-18(H) indicate time, the vertical axes in FIGS. 18(A), 18(B), and 18(D)-18(H) indicate voltage, and the vertical axis in FIG. 18(C) indicates current.

An AC input voltage shown in FIG. 18(A) is an AC voltage outputted from a commercial power supply 124, in other words an AC voltage inputted to the power supply part 530. An AC off signal shown in FIG. 18(B) is a signal outputted from the AC voltage cut-off detection circuit 540. The AC off signal indicates at Hi that the AC input voltage is supplied, and indicates at Lo that the AC input voltage is cut off. An AC off circuit consumption current shown in FIG. 18(C) is a current consumed by the AC voltage cut-off detection circuit 540. In Embodiment 5, because the X capacitor discharge IC 540*m* is used, no power consumption occurs.

A sleep signal shown in FIG. 18(D) is a signal outputted from the control part 150 to the power supply part 530. The sleep signal indicates a standby mode at Hi and a sleep mode at Lo. By moving from the standby mode to the sleep mode, the operation of the 24V DC-DC conversion part 136 is turned off, saving energy.

5V off FET pre-stage DC 5 V shown in FIG. 18(E) indicates a voltage supplied to the source side of a 5V off FET 441*c*. 24V off FET pre-stage DC 24 V shown in FIG. 18(F) indicates a voltage supplied to the source side of a 24V off FET 442*c*.

DC 5 V shown in FIG. 18(G) indicates an output voltage outputted from the power supply part 530 to the control part 150. DC 24 V shown in FIG. 18(H) indicates an output voltage outputted from the power supply part 530 to the control part 150.

Next, operations are explained using FIG. 18 in the order of time t51 through time t58 indicated on the horizontal axis. At time t51, FIGS. 18(A)-18(H) show waveforms during the standby mode. As the operation of the image forming apparatus 500, it is a state of waiting for printing. Here, because the X capacitor discharge IC 540*m* of the AC voltage cut-off detection circuit 540 is off, no current flows to the photocoupler 140*e*, and the secondary phototransistor of the photocoupler 140*e* is off. Therefore, the AC off signal shown in FIG. 18(B) is in a state of retaining Hi.

Because the X capacitor discharge IC 540*m* is off, as shown in FIG. 18(C), the AC off circuit consumption current is 0 A. Therefore, in comparison with Embodiment 4, a reduction in consumed power can be expected.

The sleep signal shown in FIG. 18(D) maintains the Hi state. The output voltage shown in FIG. 18(G) shows DC 5 V, and the output voltage shown in FIG. 18(H) shows DC 24 V. At this time, the secondary photodiode of a photocoupler 137*a* of the sleep switching circuit 137 is on, and a transistor 137*b* is on. Therefore, the rectified and smoothed voltage of a sub-primary auxiliary winding 135*d* of the 5V DC-DC conversion part 135 is supplied to the power supply terminal of a main control IC 136*c* of the 24V DC-DC conversion part 136. As shown in FIG. 18(E), the voltage supplied to the 5V off FET 441*c* is DC 5 V. Also, as shown in FIG. 18(F), the voltage supplied to the 24V off FET 442*c* is 24 V.

At time t52, by the standby mode continuing for a certain length of time, the image forming apparatus 500 moves into the sleep mode. The AC off signal shown in FIG. 18(B) does not change. In the same manner, the AC off circuit consumption current shown in FIG. 18(C) does not change, either.

As shown in FIG. 18(D), the sleep signal outputted from the control part 150 switches from Hi to Lo. Then, the secondary photodiode of the photocoupler 137*a* of the sleep switching circuit 137 turns off, and the transistor 137*b* turns off, thereby cutting off the supply of the rectified and smoothed voltage of the sub-primary auxiliary winding 135*d* of the 5V DC-DC conversion part 135 to the power supply terminal of the main control IC 136*c* of the 24V DC-DC conversion part 136. In other words, because the gate voltage input to a main FET 136*b* of the 24V DC-DC conversion part 136 stops, the operation of the 24V DC-DC conversion part 136 stops, the 24V off FET pre-stage DC 24V output starts to drop as shown in FIG. 18(F), and the DC 24V output starts to drop as shown in FIG. 18(H). At the same time, by the sleep signal outputted from the control part 150, the 24V off FET 442*c* of the 24V off circuit 442 turns off, accelerating the drop in the DC 24V output, and the output voltage becomes 0 V at time t53.

At time t54, as shown in FIG. 18(F), the voltage supplied to the 24V off FET 442*c* becomes 0 V. Because Embodiment 5 is not provided with a 24V discharge circuit 139 as in Embodiments 1-3, its dropping time becomes longer than that of DC 24 V shown in FIG. 18(H). Note that Embodiment 5 can also be provided with the 24V discharge circuit 139.

At time t55, due to a power outage, turning off an unshown power supply switch of the image forming apparatus 500, or pulling off an AC cable to the image forming apparatus 500, the AC input voltage is cut off as shown in FIG. 18(A).

Once the AC input voltage is cut off, the X capacitor discharge IC 540*m* of the AC voltage cut-off detection circuit 540 turns on, keeping the photocoupler 140*e* powered by the latch circuit, and the AC off signal switches from Hi to Lo as shown in FIG. 18(B).

Immediately after the AC input voltage cut-off, as shown in FIG. 18(G), the output of the 5V off circuit 441 retains 5 V. This is because the apparatus operation needs to be continued through a short-time power outage for about 20 ms for example. As an example of the method to retain power, as shown in FIG. 17, a capacitor 441*d* can be connected to the gate of the 5V off FET 441*c*, providing it with the time constant of a resistor and the capacitor to delay the turn-off of the 5V off FET 441c.

At time t56, after a predetermined length of time passed, the 5V off FET 441c of the 5V off circuit 441 turns off, accelerating the drop in the DC 5V output as shown in FIG. 18(G).

At time t57, as shown in FIG. 18(H), the output voltage becomes 0 V. Also, at time t58, the voltage supplied to the 5V off FET 441c becomes 0 V. Because the 5V discharge circuit 138 is mounted also in Embodiment 5, the 5V off FET pre-stage DC 5V dropping time becomes shorter. Also, note that the 5V discharge circuit 138 need not be mounted in Embodiment 5.

As stated above, according to Embodiment 5, by using the X capacitor discharge IC 540m and the latch circuit in the AC voltage cut-off detection circuit, power consumption can be further reduced.

Although explained in the above Embodiments 1-5 as the image forming apparatuses 100-500 were print devices, especially the four-color print devices of the tandem system, Embodiments 1-5 are not limited to these examples. For example, the image forming apparatuses 100-500 of Embodiments 1-5 can be print devices having five colors or more, or print devices having fewer than four colors. Also the image forming apparatuses 100-500 of Embodiments 1-5 can be monochrome print devices. Furthermore, the image forming apparatuses 100-500 of Embodiments 1-5 can be copiers, facsimile machines, or multifunction peripherals.

The configurations disclosed in Embodiments 1-5 mentioned above can be combined as appropriate.

In comparative example of FIG. 3, the current limiting resistor (without reference) connected to the rectifying element 131a has a resistance value, which is around 100 KΩ in a case where the commercial power supply is AC100V (or 120 KΩ in a case of AC120V, and 230KΩ in a case of AC230V). The current limiting resistor causes a current of around 1 mA to flow in order to stably light the light emitting diode (LED) of the photocoupler 131b. Thereby, while the commercial power supply turns on, the current of around 1 mA always flows, consuming 100 mW in the case of 100V. 120 mW is consumed in the case of 120V, and 230 mW is consumed in the case of 230 mV.

On the other hand, in embodiment 1 in FIG. 6 and embodiment 2 in FIG. 9, the current limiting resistor (without reference) that is placed between base inputs of the rectifying diode 140a (140b) and transistor 140c has a resistance value, which is around 670 KΩ in a case where the commercial power supply is AC100V (or 800 KΩ in a case of AC120V, and 1500 KΩ in a case of AC230V). The current limiting resistor causes a current of around 0.15 mA (150 μA) to flow as a base current for the transistor 140c while the commercial power supply turns on. Additionally, the transistor 140d also causes a current of around 0.15 mA (150 μA) to flow as a base current for the transistor 140d while the commercial power supply turns on through the pull-up resistor 140f The current limiting resistor (140g) connected to the rectifying/smoothing circuit 134 has a resistance value, which is around 100KΩ in a case where the commercial power supply is AC100V (or 120KΩ in a case of AC120V, and 230KΩ in a case of AC230V) in order to securely light the light emitting diode (LED) of the photocoupler 140e while the commercial power source is in a power outage, and causes the current of around 1 mA to flow in order to light the light emitting diode (LED) of the photocoupler 131b. Accordingly, a current of around 1 to 2 mA flows only when the power outage occurs, but a current of around 0.3 mA (300 μA) always flows, which is lower than a conventional practice while the commercial power supply turns on, consuming about 30 mW in the case of 100V, which is lower than that of the conventional practice. 36 mW is consumed in the case of 120V, and 69 mW is consumed in the case of 230 mV. In the invention, the power consumption while the power outage may be ranged from 20 to 40% with respect to the conventional practice. The range may be preferred between 25% and 35%. Or the power consumption may be less than 40% with respect to the conventional practice.

In embodiment 3 in FIG. 12 and embodiment 4 in FIG. 15, for the current limiting resistor 140g or 340g, a resistance value is selected in correspondence with a connected DC power supply, which causes a current of around 1 mA to flow in order to stably light the light emitting diode (LED) of the photocoupler 131b for a short period while the commercial power source is in a power outage. Additionally, the transistor 140d also causes a current of around 0.15 mA (150 μA) to flow as a base current for the transistor 140d while the commercial power supply turns on through the pull-up resistor 140f. A loss energy due to current limiting resistor or the like decreases by using low voltage that is converted with DC-DC converter or supplemental winding lines of DC-DC converter, which have an conversion efficiency of around 80 to 90% with respect to energy 15 mW or more that is lost due to current limiting resistor or the like while a current limitation of 0.15 mA is performed through a resistor from DC voltage (or DC power supply) of 100V or more in the same fashion as embodiments 1 and 2. For example, when converting to DC 25V using the DC-DC converter, the current limiting resistor 140f has a resistor value of around 160KΩ and consumes around 3.75 mW. Taking conversion efficiency of 80% in the DC-DC convertor into consideration, a low power consumption that is around 4.7 mW is executed. The power consumption is obtained with an equation follow:

3.75 mw/80%×100% 4.7 mW.

What is claimed is:

1. A power supply device, comprising:
a rectifying/smoothing circuit that receives an AC voltage input and converts the AC voltage into a DC voltage by rectification and smoothing,
an AC voltage cut-off detection circuit that detects a cut-off of the AC voltage, and
a voltage processing circuit that is connected to a post-stage of the rectifying/smoothing circuit wherein the post-stage being on a downstream side from the rectifying/smoothing circuit and operates when the AC voltage cut-off detection circuit has detected a cut-off of the AC voltage, wherein
the AC voltage cut-off detection circuit is provided with a signal transmitting element, a rectifying diode, a transistor and a first capacitor,
the signal transmitting element is connected to the post-stage of the rectifying/smoothing circuit, and receives power supplied from the rectifying/smoothing circuit and sends a signal to the voltage processing circuit when the AC voltage is cut off,
the transistor includes a base, a first terminal and a second terminal,
the rectifying diode is connected between the base of the transistor and the AC voltage,
a signal generated by the first terminal of the transistor that is used for operating the signal transmitting element is connected to a first terminal side of the first capacitor, and the second terminal of the transistor is connected to a second terminal side of the first capacitor and a DC voltage output side of the rectifying/smoothing circuit.

2. The power supply device according to claim 1, wherein the rectifying diode that is connected to a pre-stage of the rectifying/smoothing circuit wherein the pre-stage being on an upstream side from the rectifying/smoothing circuit and rectifies the AC voltage,
the transistor turns off when the voltage rectified by the rectifying diode is cut off, and
the signal transmitting element sends the signal to the voltage processing circuit when the switching element turns off.

3. The power supply device according to claim 2, wherein the transistor has lower consumed power than the signal transmitting element.

4. The power supply device according to claim 2, wherein the rectifying diode is connected to both of two power lines for the rectifying/smoothing circuit to receive the AC voltage input and full-wave rectifies the AC voltage.

5. The power supply device according to claim 2, wherein the rectifying diode is connected to one of two power lines for the rectifying/smoothing circuit to receive the AC voltage input and half-wave rectifies the AC voltage.

6. The power supply device according to claim 1, further comprising:
a line that receives the AC voltage input from a commercial power supply, which is located outside the power supply device,
an AC cable that has a neutral,
a primary capacitor installed between the commercial power supply and the rectifying/smoothing circuit, wherein
the AC voltage cut-off detection circuit is further provided with an operation circuit that is connected between the primary capacitor and the rectifying/smoothing circuit, and when the AC voltage is cut off, receives power supplied from the primary capacitor and operates the signal transmitting element.

7. The power supply device according to claim 1, wherein the rectifying/smoothing circuit is provided with a second capacitor, and
the signal transmitting element receives power supplied from the second capacitor.

8. The power supply device according to claim 1, wherein a conversion circuit for converting the DC voltage is provided in the post-stage of the rectifying/smoothing circuit, and
power rectified and smoothed in a primary side of the conversion circuit is supplied to the signal transmitting element.

9. The power supply device according to claim 1, wherein the voltage processing circuit is at least one of a discharge circuit for discharging the DC voltage and an off circuit for cutting off the DC voltage.

10. An image forming apparatus provided with the power supply device according to claim 1.

11. A power supply device, comprising:
a rectifying/smoothing circuit that receives an AC voltage input and converts the AC voltage into a DC voltage by rectification and smoothing,
a detection circuit that outputs a signal when the AC voltage is cut off, and
a voltage processing circuit that is connected to a post-stage of the rectifying/smoothing circuit and operates by using the signal of the detection circuit outputted when the AC voltage is cut off, the post-stage being on a downstream side from the rectifying/smoothing circuit, wherein
the detection circuit is provided with a signal transmitting element that receives power supplied from the rectifying/smoothing circuit and sends the signal to the voltage processing circuit when the AC voltage is cut off, and
the voltage processing circuit is provided with a voltage discharge circuit that discharges the DC voltage converted by the rectifying/smoothing circuit based on the signal outputted from the detection circuit when the AC voltage is cut off.

12. The power supply device according to claim 11, wherein
the voltage processing circuit includes a cutoff circuit that cuts off an output from a source other than the discharge circuit while the discharge circuit discharges the DC voltage.

* * * * *